United States Patent
Sawa et al.

(10) Patent No.: US 10,296,229 B2
(45) Date of Patent: May 21, 2019

(54) STORAGE APPARATUS

(71) Applicant: HITACHI, LTD., Tokyo (JP)

(72) Inventors: Kenichi Sawa, Tokyo (JP); Hisaharu Takeuchi, Tokyo (JP)

(73) Assignee: HITACHI, LTD., Tokyo (JP)

( * ) Notice: Subject to any disclaimer, the term of this patent is extended or adjusted under 35 U.S.C. 154(b) by 30 days.

(21) Appl. No.: 15/557,967

(22) PCT Filed: Jun. 18, 2015

(86) PCT No.: PCT/JP2015/067604
§ 371 (c)(1),
(2) Date: Sep. 13, 2017

(87) PCT Pub. No.: WO2016/203612
PCT Pub. Date: Dec. 22, 2016

(65) Prior Publication Data
US 2018/0052614 A1    Feb. 22, 2018

(51) Int. Cl.
*G06F 3/06* (2006.01)
(52) U.S. Cl.
CPC .......... *G06F 3/0611* (2013.01); *G06F 3/061* (2013.01); *G06F 3/064* (2013.01); *G06F 3/067* (2013.01); *G06F 3/0608* (2013.01); *G06F 3/0647* (2013.01); *G06F 3/0661* (2013.01); *G06F 3/0673* (2013.01); *G06F 3/0685* (2013.01)
(58) Field of Classification Search
CPC ...... G06F 3/0611; G06F 3/0608; G06F 3/061; G06F 3/064; G06F 3/0647; G06F 3/0661; G06F 3/067; G06F 3/0673; G06F 3/0685
See application file for complete search history.

(56) References Cited

U.S. PATENT DOCUMENTS

| 8,359,444 | B2 | 1/2013 | Arakawa |
| 10,108,644 | B1* | 10/2018 | Wigmore ............... G06F 17/303 |
| 2003/0140207 | A1 | 7/2003 | Nagase et al. |
| 2005/0268062 | A1 | 12/2005 | Nagase et al. |

(Continued)

FOREIGN PATENT DOCUMENTS

| JP | 11-272521 A | 10/1999 |
| JP | 2003-216460 A | 7/2003 |
| JP | 2006-259962 A | 9/2006 |

OTHER PUBLICATIONS

International Search Report for WO 2016/203612 A1, dated Sep. 8, 2015.

*Primary Examiner* — Eric Cardwell
(74) *Attorney, Agent, or Firm* — Volpe and Koenig, P.C.

(57) ABSTRACT

A storage apparatus according to one aspect of the present invention includes one or more storage devices and a storage controller. The storage controller separates an area of the storage device into an overwrite storage area and an append write storage area and manages the areas, and moves data between the overwrite storage area and the append write storage area. For example, less frequently updated data among write data from a host is moved to the append write storage area from the overwrite storage area. In a state where update data directed to the data stored in the append write storage area is received from a host, the storage controller compresses the update data and then performs append write of the compressed update data to the append write storage area.

8 Claims, 15 Drawing Sheets

(56) References Cited

U.S. PATENT DOCUMENTS

2006/0212625 A1* 9/2006 Nakagawa ............ G06F 3/0608
                                                   710/68
2007/0005625 A1* 1/2007 Lekatsas ............... G06F 12/023
2008/0288678 A1   11/2008 Nakagawa et al.
2014/0250282 A1    9/2014 Yamamoto

* cited by examiner

FIG. 3

| Page # | DEV# | Addr. | type | use |
|---|---|---|---|---|
| 0 | 0 | 0 | HDD | 1 |
| 1 | 0 | 15000 | HDD | 1 |
| 2 | 0 | 2a000 | HDD | 1 |
| ... | ... | ... | ... | ... |
| n | 1 | 0 | SSD | 0 |
| ... | ... | ... | ... | ... |
| ... | ... | ... | ... | ... |

Pool management table 200

FIG. 4

| Virtual page # 101 | Host LBA (hexadecimal) 102 | Page allocation 103 | Page # 104 | Presence/ Absence of update 105 | Continuous period of no update 107 | Allocation quantity 111 |
|---|---|---|---|---|---|---|
| 0 | 00000000 | Overwrite | 0 | Update | 0 days | 42MB |
| 1 | 00015000 | Overwrite | 1 | Update | 0 days | 42MB |
| 2 | 0002a000 | Append write | null | No update | 10 days | 10MB |
| 3 | 0003f000 | Append write | null | No update | 2 days | 21MB |
| 4 | 00054000 | Append write | null | Update | 2 days | 18MB |
| 5 | 00069000 | Append write | null | Update | 0 days | 38MB |
| 6 | 0007e000 | Append write | null | Update | 3 days | 40MB |
| 7 | 00093000 | Append write | null | Update | 1 day | 20MB |
| ... | | | | | | |

Virtual volume management table 100

FIG. 5

| Host LBA (121) | Data length (after compression) (122) | Data storage location (page #, relative address) (123) |
|---|---|---|
| 0002a000 | 512B | (2, 0) |
| 0002a010 | 8KB | (2, 3) |
| 0002a020 | 2KB | (2, 2) |
| ... | ... | ... |
| 0003f000 | 1KB | (3, 0) |
| ... | ... | ... |

LBA management table 120

FIG. 6

| Relative address (131) | Page # (132) | Host LBA (133) |
|---|---|---|
| 0 | 2 | 0002a000 |
| 1 | 2 | null |
| 2 | 2 | 0002a010 |
| 3 | 2 | 0002a020 |
| 4 | 2 | 0003f000 |
|  | ... | ... |

| Last write location (page #, relative address) (134) |
|---|
| (8, 2) |

Append write page (compressed page) management table 130

FIG. 7

| Compression permission threshold (301) | Page update quantity threshold in CM (302) |
|---|---|
| 7 days | 70% (29.4MB) |

Threshold table 300

FIG. 8

| Free space allocation rate 401 | Append write data quantity 402 | Allocatable quantity for update 403 | Free space use quantity 404 | Free capacity for update 405 |
|---|---|---|---|---|
| 10% | 4200MB | 420MB | 220MB | 200MB |

Free space management table 400

FIG.14

| Virtual page # 101' | Host LBA (hexadecimal) 102' | Page allocation 103' | Page # 104' | Presence/ absence of update (current) 105' | Presence/ absence of update (previous) 106' | Continuous period of no update (current) 107' | Continuous period of no update (backup) 108' | Continuous period of no update (after learning movement) 109' | Learning movement flag 110' | Allocation quantity 111' |
|---|---|---|---|---|---|---|---|---|---|---|
| 0 | 00000000 | Overwrite | 0 | Update | Update | 0 days | 20 days | 0 days | OFF | 42MB |
| 1 | 00015000 | Overwrite | 1 | Update | Update | 0 days | 0 days | 0 days | OFF | 42MB |
| 2 | 0002a000 | Append write | - | No update | No update | 10 days | 8 days | 0 days | OFF | 10MB |
| 3 | 0003f000 | Append write | - | No update | No update | 2 days | 14 days | 0 days | ON | 21MB |
| 4 | 00054000 | Append write | - | Update | No update | 2 days | 14 days | 0 days | OFF | 18MB |
| 5 | 00069000 | Append write | - | Update | Update | 0 days | 11 days | 0 days | OFF | 38MB |
| 6 | 0007e000 | Append write | - | Update | No update | 3 days | 7 days | 0 days | OFF | 40MB |
| 7 | 00093000 | Append write | - | Update | No update | 1 day | 10 days | 0 days | OFF | 20MB |
| ⋮ | ⋮ | ⋮ | ⋮ | ⋮ | ⋮ | ⋮ | ⋮ | ⋮ | ⋮ | ⋮ |

Virtual volume management table 100'

| Compression permission threshold ~301 | Page update quantity threshold in CM ~302 | Learning movement threshold ~303 |
|---|---|---|
| 28 days | 70% | 27 days |

Threshold table 300'

STORAGE APPARATUS

TECHNICAL FIELD

The present invention relates to storage apparatuses.

BACKGROUND ART

Storage apparatuses are equipped with a plurality of storage devices configured to store data, and a storage controller configured to control the storage devices, wherein the object thereof is to provide a data storage space having a large capacity to a host computer.

There storage apparatuses are required to save a large amount of data at a low cost. In order to satisfy such demands, a technique is known to record data via lossless compression (hereinafter simply referred to as compression). If data size is reduced by compression and recorded in the storage device, cost of retaining data (such as bit cost of storage medium or cost of power consumed by the storage apparatus) can be reduced.

If data is compressed and recorded in the storage device, overhead of compression processing occurs during write and overhead of decompression processing of compressed data occurs during read, such that the access performance may be deteriorated. In order to avoid this drawback, a technique related to selectively performing compression of data exits. For example, patent literature 1 discloses a storage system configured to manage a plurality of storage tiers, in which data moved to a lower tier is compressed and stored.

CITATION LIST

Patent Literature

[PTL 1] Specification of U.S. Pat. No. 8,359,444

SUMMARY OF INVENTION

Technical Problem

In compressing data, compression rate varies depending on the contents of data. Therefore, after compressing data and storing the data in the storage device, if the storage system receives an update data of that data from the host computer, the size of the update data after compression may be larger than the size of the compressed data stored in the storage device. In that case, the compressed update data cannot be overwritten to the area in which compressed data before update has been recorded, and a different storage method is required.

Solution to Problem

According to one aspect of the present invention, a storage apparatus includes one or more storage devices, and a storage controller. The storage controller manages an area of the storage device by dividing into an overwrite storage area and an append write storage area, and moves data between the overwrite storage area and the append write storage area.

For example, among the write data from the host, less frequently update data is moved from the overwrite storage area to the append write storage area. If update data directed to the data stored in the append write storage area is received from the host, the storage controller performs append write of update data to the append write storage area.

Advantageous Effects of Invention

According to one aspect of the present invention, the efficiency of the storage apparatus can be improved.

BRIEF DESCRIPTION OF DRAWINGS

FIG. 3 illustrates a configuration example of a pool management table.

FIG. 4 illustrates a configuration example of a virtual volume management table.

FIG. 5 illustrates a configuration example of an LBA management table.

FIG. 6 illustrates a configuration example of a compressed page management table.

FIG. 7 illustrates a configuration example of a threshold table.

FIG. 8 illustrates a configuration example of a free space management table.

FIG. 14 is a configuration example of a virtual volume management table in the storage apparatus according to a second embodiment.

DESCRIPTION OF EMBODIMENTS

Figure 1:
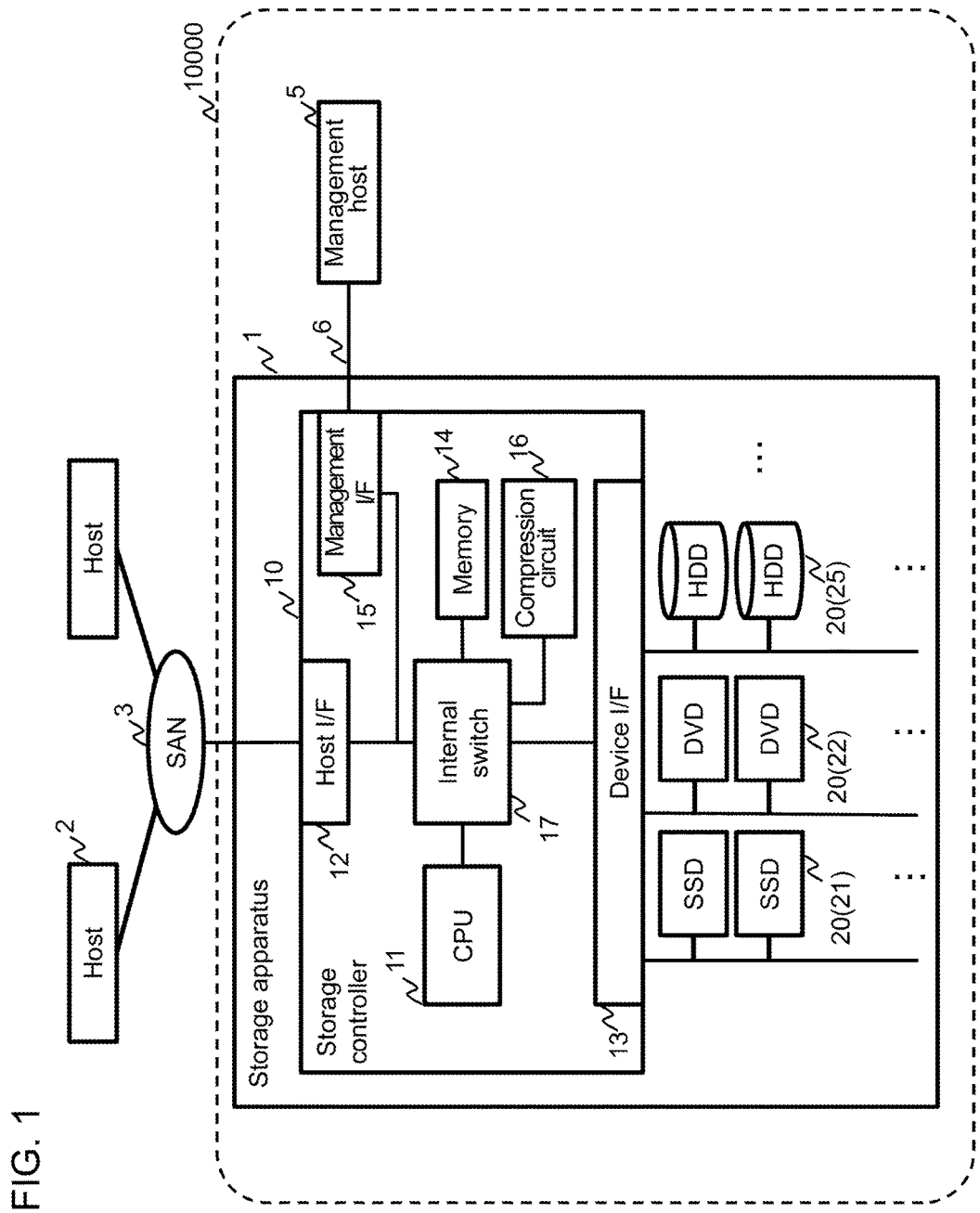
FIG. 1 illustrates a configuration example of a computer system including a storage apparatus according to a first embodiment.

Now, some embodiments will be described with reference to the drawing. Before describing the embodiments, various terms used in the embodiments will be described.

In the present embodiment, "compression" refers to a processing of reducing data size while maintaining the meaning of the data, using a lossless compression algorithm such as LZW algorithm. In a storage apparatus according to the present embodiment, data written from a host to a storage apparatus may be compressed. Data having its size reduced by being subjected to compression processing in the storage apparatus is called "compressed data", and data not subjected to compression processing in the storage apparatus is called "uncompressed data". The processing of using a lossless compression algorithm to return the compressed data to an original data size is called "decompression" or "unzipping".

In the present embodiment, "compression rate" is used as an index of reduction efficiency of data size by data compression. The compression rate according to the present embodiment is defined by the following calculation formula.

Compression rate=(uncompressed data size−compressed data size)÷uncompressed data size According to the present embodiment, compression rate is defined by the above-described calculation formula, such that the compression rate may be a value between 0 and 1. Therefore, a "compression rate being low" refers to a state where the data size has not been sufficiently reduced by compression. As an example, if the data size is not changed at all as a result of the compression processing, the compression rate will be 0. In contrast, a "compression rate being high" refers to a state where the amount of reduction of data size by compression is high.

"Update" of storage area refers to rewriting (overwriting) a content of the data stored in the storage area to a new content. The data having been stored in a certain storage area prior to update of the storage area is called "data before update". Meanwhile, the data newly written to that storage area is called "update data" or "data after update".

A "volume" refers to a storage space that a target device such as a storage apparatus or a storage device provides to an initiator device such as a host computer. When the initiator device issues a data write request directed to the area in the storage space, data is stored in the area of the target device mapped to the area. The storage apparatus according to the present embodiment provides a virtual volume formed by a so-called thin provisioning technique to the host as volume. In an initial state (immediately after defining the virtual volume), the virtual volume does not have a storage device mapped to the area in the storage space. At a point of time when the initiator device (host) issues a data write request to the area in the storage space, the storage apparatus dynamically determines the storage device mapped to the area.

In the present embodiment, a "block" refers to the area on the storage space (such as the volume) that the target device provides to the initiator device. Also in the present embodiment, the block is an area whose size is equal to a minimum access unit of a volume and the like, and has a fixed length. The size of a block is, for example, 512 bytes. Upon accessing each block in the storage space, the initiator device accesses each block by designating an address assigned to each block. This address is called a "Logical Block Address (LBA)". Especially in the present embodiment, the LBA assigned to a block on a volume (virtual volume) that the storage apparatus provides to the host is sometimes called "host LBA".

"Append write" or "append" refers to an action of writing data sequentially to an unused area in the storage area. In the storage apparatus according to the present embodiment, a storage area for append write is provided. Upon performing an append write processing, the storage apparatus writes data sequentially from a head of the storage area for append write. The storage apparatus stores the last address in which data was written by the immediately preceding append processing, and upon performing the append write processing, it writes data at a subsequent address of the last address.

First Embodiment (1) System Configuration

FIG. 1 illustrates a configuration example of a computer system including a storage apparatus 1 according to a first embodiment. The storage apparatus 1 includes a storage controller 10, and a plurality of storage devices 20 connected to the storage controller 10.

The storage devices 20 are used by the storage apparatus 1 for storing write data from a superior device such as a host 2. For example, HDDs (Hard Disk Drives) 25 using magnetic disks as storage media or SSDs (Solid State Drives) 21 adopting nonvolatile semiconductor memories such as flash memories as storage media are used as the storage devices. Further, removable storage media such as DVD-RWs (22) may also be used. The storage devices 20 is connected to the storage controller 10 via a transmission line complying with SAS (Serial Attached SCSI) standards (SAS link) or a transmission line complying with PCI (Peripheral Component Interconnect) standards (PCI link) for example.

One or more hosts 2 are connected to the storage controller 10. Further, a management host 5 is connected to the storage controller 10. The storage controller 10 and the host 2 are connected via a SAN (Storage Area Network) 3 formed using a Fibre Channel, as an example. The storage controller 10 and the management host 5 are connected via a LAN (Local Area Network) 6 formed using an Ethernet, as an example.

The storage controller 10 includes, at least, a processor (also referred to as CPU) 11, a host interface (denoted as "host I/F") 12, a device interface (also referred to as "device I/F") 13, a memory 14, a management I/F 15, and a compression circuit (also referred to as a compression portion) 16. The processor 11, the host I/F 12, the device I/F 13, the memory 14, the management I/F 15 and the compression circuit 16 are mutually connected via an internal switch (internal SW) 17. Only one each of these components are illustrated in FIG. 1, but in order to ensure high performance and high availability, a plurality of the respective components may be installed in the storage controller 10. The respective components may be mutually connected via a common bus instead of the internal SW 17.

The device I/F 13 includes at least an interface controller and a transfer circuit. The interface controller is a component for converting a protocol (such as the SAS) used in the storage devices 20 to a communication protocol (such as the PCI-Express) used inside the storage controller 10. The transfer circuit is used when the storage controller 10 performs data transfer (read or write) to the SSD 21.

Similar to the device I/F 13, the host I/F 12 includes at least an interface controller and a transfer circuit. The interface controller owned by the host I/F 12 is used for converting the communication protocol (such as the Fibre Channel) used in a data transfer path between the host 2 and the storage controller 10 to a communication protocol used inside the storage controller 10.

The processor 11 performs various control of the storage apparatus 1. The memory 14 is used for storing programs (called storage control programs) executed by the processor 11 and various management information of the storage apparatus 1 used by the processor 11.

In the present specification, a description is sometimes adopted stating that the storage apparatus 1 (or the storage controller 10) executes processing such as a destage processing or a move judgement processing (described later). In a more accurate description, it should be described that the CPU 11 performs these processing using the host I/F 12, the device I/F 13, the memory 14 and the compression circuit 16, by the storage control program executed in the processor (CPU) 11. But in order to avoid lengthy description, a description is sometimes adopted stating that the storage controller 10 (or the storage apparatus 1) executes these processes.

Further, the memory 14 is also used for temporarily storing I/O target data directed to the storage devices 20. Hereafter, the storage area within the memory 14 used for temporarily storing the I/O target data directed to the storage devices 20 is called a "cache memory" or a "cache". The memory 14 is composed of a volatile storage medium such as a DRAM or an SRAM, but in another embodiment, the memory 14 can be composed of a nonvolatile memory. Further, if a volatile storage media is used as the memory 14, it is possible to adopt a configuration where an auxiliary power supply such as a battery is provided to the storage apparatus 1, such that the stored contents of the memory 14 can be maintained during power outage.

The management host 5 is a computer for performing management operation of the storage apparatus 1. The management host 5 comprises an input/output device (not shown) such as a keyboard, a display, etc., and the user (administrator) can set or enter instruction to the storage apparatus 1 through the input/output device. Further, the management host 5 can display information such as the status of the storage apparatus 1 on an output device such as a display.

A compression portion (compression circuit) 16 is a hardware equipped with a function to compress data or to decompress the compressed data. The storage apparatus 1 can compress a part (or all) of the data stored in the storage devices 20 using the compression portion 16. The compression portion 16 is implemented in hardware such as ASIC (Application Specific Integrated Circuit) and the like. However, it is possible to provide a processor and a memory to the compression portion 16, and have the processor execute a program for compressing data, such that the compression portion 16 performs compression and decompression of data. In another configuration, a CPU 11 can perform compression and decompression of data by having the CPU 11 execute a program for compressing data, without providing a dedicated hardware such as the compression portion (compression circuit) 16 to the storage controller 10.

(2) Management of Storage Area

Next, a storage area managed by the storage apparatus 1 according to the present embodiment will be described. The one or more storage devices 20 included in the storage apparatus 1 according to the present embodiment provide storage spaces having a predetermined size to the storage controller 10. The storage controller 10 does not provide the storage space provided by the storage devices 20 directly to the host 2. The storage controller 10 provides one or more virtual storage spaces to the host 2 that differ from the storage spaces provided by the storage devices 20. The virtual storage space is called a "virtual volume". The storage controller 10 is capable of providing a plurality of virtual volumes to the host 2, but unless stated otherwise, the following description describes an example in which the storage controller 10 provides one virtual volume to the host 2.

The storage apparatus 1 manages the storage space of the virtual volume by dividing it into a plurality of partial areas having a predetermined size (42 MB, for example). In the present embodiment, the partial areas are called "virtual pages". In the following description, an example is illustrated of a case where the virtual page size is 42 MB, but the size of the virtual page may be other sizes. The virtual volume is a volume formed using a known thin provisioning technique and the like, and at a point of time when an access request directed to the virtual page in the virtual volume is received, the storage apparatus 1 dynamically allocates (maps) a storage area in the storage device 20 to the virtual page.

When the storage apparatus 1 receives a write request directed to the virtual page in the virtual volume from the host 2, the storage apparatus 1 selects an unused area (area not yet allocated to the virtual page) among the storage areas in the storage devices 20, and allocates (maps) the selected area to the access target virtual page. The write data from the host 2 is stored in the area (page) mapped to this access target virtual page. Further, the storage apparatus 1 stores the corresponding relationship (mapping) of the virtual page and the storage area allocated to the virtual page in a mapping table (called a virtual volume management table 100 in the present embodiment). In a state where a read request directed to the virtual page is received, the storage apparatus 1 refers to the mapping table to specify the storage area allocated to the virtual page, and reads data from the specified storage area.

Figure 2:
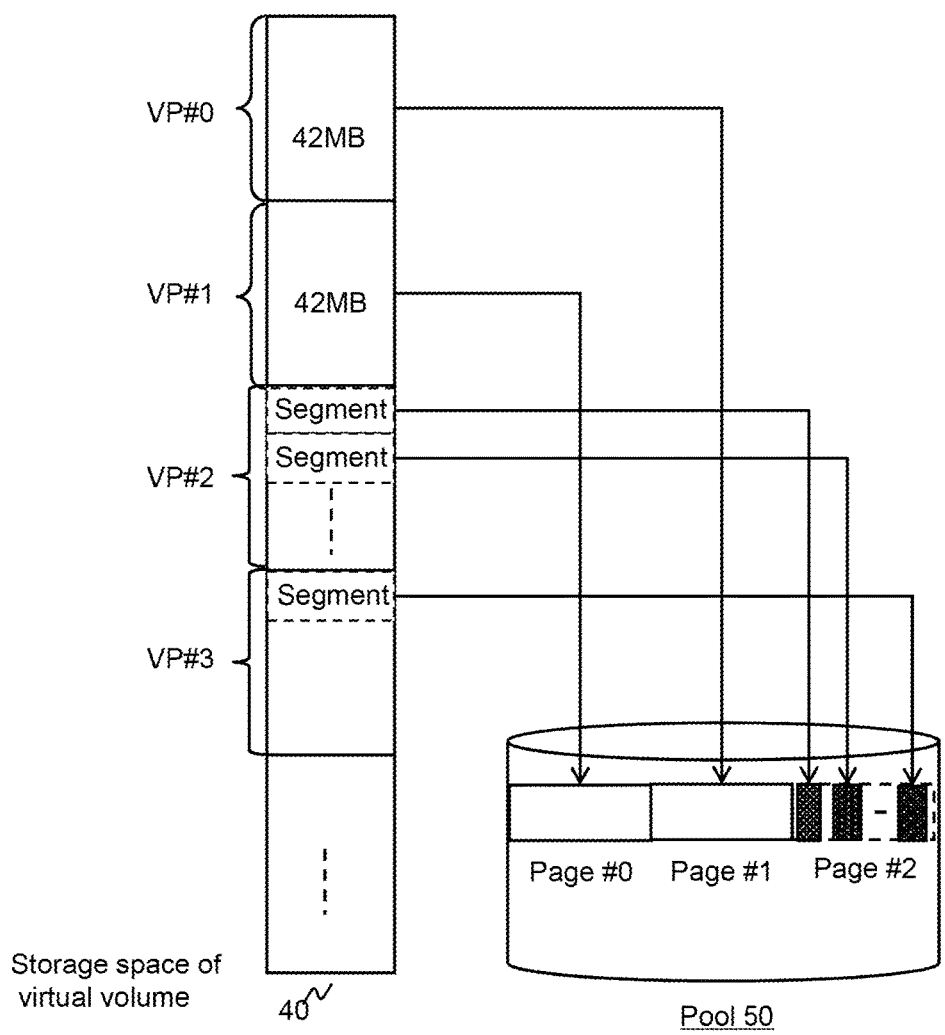
FIG. 2 is a view illustrating a relationship between a virtual volume and pages.

FIG. 2 illustrates an example of relationship between the virtual volume and the storage area being allocated to the virtual volume. In the present embodiment, among the storage areas in the plurality of storage devices 20, a set of storage areas to be allocated to the virtual volume is called a "pool". The storage area in the pool is divided into partial areas having the same size as the virtual page, and managed. The partial area having the same size as the virtual page is called a "physical page" or a "page".

A rectangular shaped object 40 illustrated in FIG. 2 represents a storage space of the virtual volume. A cylindrical object 50 represents the pool.

Each virtual page is assigned with a unique identification number (a non-negative integer is used as the identification number) called a virtual page number (also denoted as VP #). In the following description, the virtual page having a virtual page number n (n being a non-negative integer) is denoted as "VP #n". Similarly, each physical page is assigned with an identification number unique within the storage apparatus 1 called a physical page number (or page #) (this identification number is also a non-negative integer). In the following description, the physical page having a physical page number n (n being a non-negative integer) is denoted as "page #n".

A page is not mapped to each virtual page in the virtual volume immediately after the virtual volume has been defined. Only after receiving a write request directed to the area in the virtual page from the host 2, the storage controller 10 determines the physical page to be allocated to the virtual page including the relevant area. As for the physical page determined here, an arbitrary page is selected from the pages (unused pages) not yet allocated to a virtual page. FIG. 2 illustrates an example in which page #1 is mapped to VP #0, and page #0 is mapped to VP #1.

When the storage apparatus 1 receives a write request (and write data) directed to an area (one or a plurality of blocks) within the virtual page from the host 2, the write data is stored in the block within the physical page mapped to the virtual page. In the storage apparatus 1 according to the present embodiment, in principle (excluding the case of storing compressed data described later), a relationship is realized in which write data subjected to a write request to the n-th block from the head of the virtual page is stored in the n-th block from the head of the physical page mapped to the virtual page. Therefore, the storage apparatus 1 can uniquely specify the storage area in the storage device 20 mapped to an arbitrary block in the virtual volume only by keeping the mapping of the virtual page and the storage area (physical page) allocated to the virtual page in the mapping table.

However, when a compressed data is stored in the page, the above does not apply. VP #2 and VP #3 in FIG. 2 show the case how compressed data is stored, and in that case, a regular relationship in which data written to the n-th block from the head of the virtual page is written to the n-th block of the physical page is not maintained. The details will be described later.

FIG. 3 illustrates an example of a pool management table 200. The pool management table 200 is a table managing pools, which are a set of storage areas to be allocated to the virtual volume, and the table is stored in a memory 14.

Information of a physical page in the pool is stored in each row (record) of the pool management table 200. The respective records include fields of a page # (201), a DEV # (202), an Addr (203), a type (204), and a use (205). The page # (201) stores a page number of a physical page. In other words, the record whose page # (201) is n is a record managing the information of page # n.

The DEV # (202) and the Addr (203) store identification number of the storage device to which the physical page belongs and an address within the storage device. The type (204) stores a type of the storage device (such as the HDD or the SSD) to which the physical page belongs. The use (205) stores information indicating the status of use of the physical page. In a state where the physical page is mapped to the virtual page, "1" is stored in the use (205). In contrast, if the physical page is not mapped to the virtual page, "0" is stored in the use (205).

The present embodiment illustrates an example in which a storage area of the storage device 20 (such as the HDD) is registered in a pool 50, and each page is composed of storage area in one storage device 20, but other configuration methods of pools can be adopted. For example, if the storage apparatus 1 forms one logical storage device (called logical device) from a plurality of storage devices 20 using RAID (Redundant Arrays of Independent (or Inexpensive) Disks) technique, the storage area in the logical device may be registered in the pool. In that case, an identification number of the logical device and the address within the logical device are stored in the DEV # (202) and the Addr (203) of the pool management table 200.

FIG. 4 illustrates an example of the virtual volume management table 100. The virtual volume management table 100 is also stored in the memory 14. Each record of the virtual volume management table 100 stores information on a virtual page in the virtual volume. Specifically, each record stores information of a virtual page # (101), a host LBA (102), a page allocation (103), a page # (104), a presence/absence of update (105), a continuous period of no update (107), and an allocation quantity (111).

The virtual page # (101) stores a virtual page number of the virtual page. The host LBA (102) stores an LBA (host LBA) corresponding to the head block within the virtual page. That is, each record of the virtual volume management table 100 indicates that the virtual page specified by the virtual page # (101) corresponds to a one-page (42 MB) area having the host LBA (102) as the start address. In the example of FIG. 4, the host LBA (102) of the record whose virtual page # (101) is 1 is "00015000", which indicates that the area of the virtual volume whose host LBA is 00015000 to 00019fff corresponds to VP #1.

A page # of the physical page allocated to the virtual page is stored in the page # (104). If a physical page is not allocated, an invalid value (null; a value normally not used as a page number, such as "−1") is stored in the page # (104).

The example of the virtual volume management table 100 described here illustrates a case where one virtual volume is defined in the storage apparatus 1. If a plurality of virtual volumes are defined in the storage apparatus 1, in order to uniquely specify the area in the virtual volume, in addition to the host LBA (102), an identifier of the virtual volume (such as a Logical Unit Number (LUN) which is an identification number used by the host 2 to specify the volume) is included in the virtual volume management table 100.

The presence/absence of update (105) stores "no update" if there was no write request issued to the virtual page for a predetermined period of time (such as one day), and stores "update" if there was a write request to the virtual page during the predetermined period of time. The continuous period of no update (107) stores the period of time during which there was no write request issued to the virtual page.

Before describing the page allocation 103 and the allocation quantity (111), we will describe a page compression performed in the storage apparatus 1 according to the present embodiment. When the storage apparatus 1 receives a data write request directed to the virtual page of the virtual volume from the host 2, if a page is not mapped to the virtual page, a page is mapped to the virtual page, and thereafter, data is written as it is (without performing compression processing) to the page. Then, according to the status of the page, the storage apparatus 1 compresses the data in the page.

The present embodiment will illustrate an example in which if the storage apparatus 1 detects a page "in a state where data write (update) has not been performed to the page for a predetermined period of time or longer", it compresses the data in the page. However, other conditions can be used as the condition for performing compression of data in the page. For example, the data in a page can be compressed if the page to be subjected to compression is designated from outside (such as the management host 5 or the host 2).

If the data stored in a page in the state where compression processing is not performed (uncompressed data) is compressed, the compressed data will be stored in a page that is different from the page in which the uncompressed data has been stored. In the following description, the page storing the uncompressed data is called an "overwrite page", and the page storing the compressed data is called an "append write page". The append write page is sometimes called a compressed page. In the storage apparatus 1 according to the present embodiment, the append write page is also a page in the pool 50 (page managed by the pool management table 200). However, the storage apparatus 1 has a table managing only the append write pages (append write page management table) such that the overwrite page and the append write page can be distinguished. The details will follow.

When compressing the data, the storage apparatus 1 performs compression to each partial area having a predetermined size in the virtual page (or overwrite page). In the storage apparatus 1 according to the present embodiment, the area in the virtual page is divided in to 8-KB partial areas sequentially from the head of the virtual page, and data compression is performed in each partial area. In the present embodiment, the 8-KB partial area is called a "segment". A size other than 8 KB can also be adopted as the size of the partial area.

For example, if a data in a page (overwrite page) mapped to VP #2 is to be compressed, the storage controller 10 reads data in 8-KB units from the head of the page mapped to VP

2, and compresses each of the 8-KB data being read using the compression circuit 16. A lump of data (chunk) generated by compressing a 8-KB data is called a "compressed segment". The storage controller 10 stores the compressed segment to an append write page. In principle, in order to compress data in the overwrite page, all the data in the overwrite page is compressed and moved to the append write page.

Pieces of data in multiple overwrite pages can be stored (as compressed segments) in one append write page. FIG. 2 illustrates an example in which the data written to VP #2 (more precisely, the data stored in the overwrite page mapped to VP #2) and data written to VP #3 are moved to page #2 serving as the append write page.

We will return to the description of the page allocation 103 and the allocation quantity (111) in FIG. 4. If "overwrite" is stored in the page allocation 103 of a certain record, it means that the data of the virtual page managed by the record is stored in the overwrite page. Further, if "append write" is stored in the page allocation 103 of that record, it means that the data of the virtual page managed by the record is stored in the append write page. When "append write" is stored in the page allocation 103 of a record, an invalid value (null) is stored in the page # (104) of the record.

An amount of data of the virtual page managed by the record is stored in the allocation quantity 111 of each record. If the data of the virtual page is not compressed, a size (such as 42 MB) equal to the size of a page (or virtual page) is stored in the allocation quantity 111. If the data of the virtual page is compressed, the size after compressing the data of the virtual page is stored in the allocation quantity 111. In the example of FIG. 4, the allocation quantity 111 of the record in which the virtual page # (101) is "2" (that is, the record storing management information of VP #2) is 10 MB, which means that the data of VP #2 is compressed to 10 MB.

In a state where the data in the virtual page is moved to the append write page, finer grained management than page-level must be required to manage the storage areas mapped to the virtual page. Therefore, the storage apparatus 1 according to the present embodiment has a table (LBA management table) for managing mapping information related to the virtual page whose data has been moved to the append write page. FIG. 5 illustrates an example of an LBA management table 120. The LBA management table 120 includes columns of a host LBA 121, a data length 122, and a data storage location 123. The LBA management table 120 is also stored in the memory 14.

Each record of the LBA management table 120 stores information of the storage area mapped to the segment in the virtual page. The host LBA 121 stores a host LBA of a head block of the segment in the virtual page. The data storage location 123 stores location information on the append write page. A set of physical page number and a relative address in the physical page is used as the location information stored in the data storage location 123. The relative address in the physical page is an offset address in a state where the address of a head block within the physical page is set to 0. For example, if location information of a k-th block from the head of page # n (n is an integer) is stored, then (n, (k−1)) is stored.

The data length 122 stores the size of the compressed data. That is, each record indicates that among the areas in the virtual volume (virtual page), the 8-KB area starting from the address specified by the host LBA 121 has mapped thereto the area starting from the data storage location 123 and having a length indicated in the data length 122 (compressed data is stored in this area).

FIG. 6 illustrates an example of an append write page (compressed page) management table 130 and a last write location 134. The append write page management table 130 is a table for managing the page allocated as the append write page, and the table is stored in the memory 14. The append write page management table 130 includes columns of a relative address 131, a page # (132), and a host LBA (133). It indicates that the physical page having the page number recorded in the page # (132) column is allocated as an append write page. The relative address 131 stores a relative address in the physical page specified by the page # (132).

It indicates that the block specified by the relative address 131 and the page #(132) is mapped to the 8-KB area in the virtual volume having the host LBA (133) as the start address. Since the size of the compressed data is not fixed (varied according to data content), there may be a case where a plurality of blocks are mapped to the 8-KB area in the virtual volume having the host LBA (133) as the start address. For example, if the size of the compressed data is 1 KB, two records having the same host LBA (133) and different relative address 131 and page # (132) exist.

By maintaining the virtual volume management table 100, the pool management table 200 and the append write page management table 130, the storage apparatus 1 can manage the storage areas in the pool by dividing into the append write pages and the overwrite pages. In the virtual volume management table 100, the page mapped to the virtual page whose page allocation (103) is "overwrite" (page specified by the page # (104)) is the overwrite page, and the page whose page number is recorded in the page # (132) in the append write page management table 130 is the append write page. The page that is neither an overwrite page nor an append write page (pages whose use (205) is "0" in the pool management table 200) can be used either as the overwrite page or the append write page.

The storage area used as the overwrite page and the storage area used as the append write page can be storage areas belonging to the same storage device 20. However, the storage area used as the overwrite page and the storage area used as the append write page can belong to different storage devices 20. Further, the set of append write pages is sometimes called "append write pool".

Further, the storage controller 10 also manages the last write location 134 (retained in the memory 14). The last write location 134 indicates the location of the area where the compressed segment was written last, and the storage controller 10 determines the write destination of the compressed segment based on the last write location 134 when it performs append write. A subsequent address of the last write location 134 corresponds to a head location of the unused area of the append write page, and the area before the last write location 134 is an area storing compressed segments (or area where compressed segments was stored in the past). When the storage controller 10 writes a compressed segment to the append write page, it writes (that is, appends) the compressed segment from the subsequent address of the last write location 134. After writing the compressed segment, the storage controller 10 updates the last write location 134.

Next, we will briefly describe how the respective management tables (such as the LBA management table 120 and the append write page management table 130) described above are used when the storage controller 10 performs read/write of the append write page. At first, we will describe an outline of the processing performed in a state where the storage apparatus 1 receives a read request from the host 2 to the area in the virtual page mapped to the append write page.

When the storage apparatus 1 receives a read request from the host 2, the storage controller 10 calculates the VP # from the read destination address (LBA) included in the read request. In the following description, an example is illustrated of a case where the VP # is k. Next, the storage controller 10 refers to the virtual volume management table 100, and if the page allocation 103 of VP #k is "append write", it specifies the storage location (the data storage location 123 and the data length 122) of the read target data by referring to the LBA management table 120. If the data storage location 123 and the data length 122 of the read target data are specified, by referring to this information and the pool management table 200, the storage controller 10 can specify in which area of which storage device the read target data is stored.

The storage controller 10 reads the read target data from the specified storage device. Since the data being read is compressed, the storage controller 10 uses the compression circuit 16 to decompress the data, and returns the decompressed data to the host 2.

Further, the storage apparatus 1 can receive an update request from the host 2 to a virtual page whose data has been moved to the append write page. We will briefly describe the processing that the storage apparatus 1 performs upon receiving a write (update) request from the host 2 to a virtual page to which append write pages are mapped. We will assume the case that the data write range designated by the write request corresponds to a segment boundary.

At this time, the storage controller 10 compresses the write data (update data) received from the host 2, and generates a compressed segment. In the following description, the compressed segment is called "compressed segment after update". Meanwhile, the data before update of the write data (update data) is recorded in a compressed state in the append write page. The data before update in the compressed state recorded in the append write page is called "compressed segment before update".

As described above, the compressed segment after update is appended after the last compressed segment stored in the append write page. The storage controller 10 performs update of the LBA management table 120 and the append write page management table 130.

We will briefly describe the update of the LBA management table 120 and the append write page management table 130. The following describes an example of a case where host LBA of the write destination of write data (update data) is x, and the set of page number and relative address of the write destination of the compressed segment after update is (y, z), and where the set of page number and the relative address of the area storing the compressed segment before update is (y', z'). In this case, on the record whose host LBA (121) is x among the records of the LBA management table 120, (y, z) is written to the data storage location 123, and the size of the compressed segment is stored in the data length 122.

Further, x is stored in the host LBA (133) of the record whose page # (132) is y and relative address (131) is z in the append write page management table 130. Then, the value of the host LBA (133) of the record whose page # (132) is y' and the relative address (131) is z' in the append write page management table 130 is changed to "null". That is, the area where the compressed segment before update was stored is changed to an area which is not mapped to the virtual page.

The reason why the compressed segment after update is not stored (overwritten) in the storage area storing the compressed segment before update is because the size of the compressed segment after update may be different from the size of the compressed segment before update. Especially if the size of the compressed segment after update is larger than the size of the compressed segment before update, the compressed segment after update cannot be overwritten to the storage area storing the compressed segment before update. The storage apparatus 1 according to the present embodiment solves the problem by appending the compressed segment after update to the append write page.

If the size of the write data is smaller than the segment size, the storage controller 10 reads the compressed segment stored in the append write page, decompresses the data using the compression circuit 16, and stores the decompressed data in the cache memory. Then, the storage controller 10 overwrites the write data received from the host 2 to the decompressed data on the cache memory, and compresses the overwritten decompressed data using the compression circuit 16, by which a compressed segment after update is created. The compressed segment after update is also appended in the unused area of the append write page.

The above description mainly describes the method of use of the respective management tables (such as the LBA management table 120, the append write page management table 130, and the like). Therefore, the processing actually performed in the storage controller 10 upon receiving a write (update) request from the host 2 especially to the virtual page may somewhat differ from the processing described above. For example, if a write (update) request is received from the host 2 to a virtual page whose data has been moved to the append write page, a processing that differs from the above-described processing is performed depending on the condition, such as moving the data from the append write page to the overwrite page. The details of the processing that the storage apparatus 1 performs upon receiving a write (update) request from the host 2 will be described in detail later.

Next, we will describe a garbage collection. If the last write location 134 reaches an end of the area managed by the append write page management table 130, data cannot be written to the append write page. Therefore, the storage apparatus 1 is required to either newly allocate an unused append write page, or to perform garbage collection of the append write page. Garbage collection is a processing of collecting the area not mapped to the virtual page (unused area) among the areas in the append write page, and packing the data (moving data forward in the append write page).

With reference to FIG. 6, the host LBA 133 corresponding to the block whose relative address 131 is 1 and the page # (132) is 2 is null. Therefore, in the garbage collection processing, the data in the subsequent block (block whose relative address (131) is 2 and the page (132) is 2) is moved to the block whose relative address 131 is 1 and the page # (132) is 2, the data in the next block (block whose relative address (131) is 3 and the page (132) is 2) is moved to the block whose relative address 131 is 2 and the page # (132) is 2, and such processing is repeatedly executed to perform packing of data. At the same time, update of the LBA management table 120 is performed. Here, an example has been illustrated of a case where data is moved on a block-by-block basis to simplify the description of the concept of garbage collection, but garbage collection can be performed by methods other than that described above. For example, for efficient processing, a plurality of blocks can be collectively read and moved.

(3) Management of Threshold and Free Space Size

FIG. 7 illustrates a content of a threshold table 300 managed by the storage apparatus 1 according to the present embodiment. The threshold table 300 is stored in the memory 14. The threshold table 300 stores a compression permission threshold 301, and a page update quantity threshold in CM 302. The values stored in the threshold table 300 are set or changed by an administrator through a management host 5 and the like. As another embodiment, recommended values can be set in the threshold table 300 in advance. Number of days (or time) is stored in the compression permission threshold 301. In the storage apparatus 1 according to the present embodiment, if an overwrite page is not updated for a predetermined period of time or more designated by the compression permission threshold 301, the data in the overwrite page is moved to the append write page. In the example of FIG. 7, "7 days" is stored in the compression permission threshold 301, such that in this case, the storage apparatus 1 moves the data in the overwrite page that has not been updated for 7 days or more to the append write page.

The page update quantity threshold in CM 302 stores information related to the trigger for moving data in the append write page to the overwrite page. If the amount of update data (from the host 2) directed to a certain append write page is not less than the amount designated by the page update quantity threshold in CM 302, the storage apparatus 1 according the present embodiment moves the data in the append write page to the overwrite page. A ratio (percentage) of update data quantity to a one-page size is stored in the page update quantity threshold in CM 302. However, a data amount (in byte or MB) can be stored instead of the ratio.

In the example of FIG. 7, "70%" is stored in the page update quantity threshold in CM 302. Therefore, when the storage apparatus 1 receives 29.4 MB (42 MB (size of a page)×70%=29.4 MB) or more update data from the host 2 directed to a certain virtual page to which the append write page is mapped, and the data is accumulated in the cache memory, it maps an overwrite page instead of the append write page to the virtual page, stores the data which was stored in the append write page to the overwrite page, and writes the update data on the cache memory to the overwrite page. The details of the processing will be described later.

Next, the contents of a free space management table 400 managed by the storage apparatus 1 according to the present embodiment will be illustrated in FIG. 8. The free space management table 400 is stored in the memory 14. The free space management table 400 stores information on a free space allocation rate 401, an append write data quantity 402, an allocatable quantity for update 403, a free space use quantity 404, and a free capacity for update 405. Among the information stored in the free space management table 400, the free space allocation rate 401 is a value set in advance (the value can be a non-variable fixed value, or a variable value that the administrator can set through the management host 5 or the like), and other values are values determined (calculated) by the storage apparatus 1 based on the amount of data moved from the overwrite page to the append write page and the like.

The append write data quantity 402 is a quantity of data moved from the overwrite page to the append write page. In the present embodiment, this quantity of data represents the amount of data when it is in a compressed state. However, the amount of data when it is not in a-compressed state can also be used as the append write data quantity 402. Further, when update of data in the append write page occurs, the value of the append write data quantity 402 is recalculated. The details will be described later.

The free space allocation rate 401 is information for calculating an amount of pages for storing update data directed to the data in the append write pages. This (set of) pages for storing update data is called a free space. The storage apparatus 1 according to the present embodiment determines the amount of pages allocatable as free space based on the append write data quantity 402. The value stored in the free space allocation rate 401 is a ratio (percentage) of the size of free space to the append write data quantity 402. In the example of FIG. 8, the append write data quantity 402 is 4200 MB and the free space allocation rate 401 is 10%, so the storage apparatus 1 can allocate a number of pages corresponding to 420 MB (4200 MB×10%) as free space. This value (420 MB) is stored in the allocatable quantity for update 403.

The amount of area storing the update data among the append write pages is stored in the free space use quantity 404. This value does not include the amount of data moved from the overwrite page to the append write page. Therefore, when an update directed to the data moved from the overwrite page to the append write page did not occur, the free space use quantity 404 is 0. Further, the free space use quantity 404 indicates the total size of data (update data) actually written to the append write page. Therefore, if compressed update data is stored, the free space use quantity 404 is equal to the total size of update data after compression written in the append write page.

The free capacity for update 405 stores the difference between the allocatable quantity for update 403 and the free space use quantity 404. The allocatable quantity for update 403 is an upper limit value of the amount of pages that can be allocated as the append write page, and pages more than the allocatable quantity for update 403 is not allocated as free space. If the sum of the amount of update data to be written into the append write page becomes equal to or larger than the allocatable quantity for update 403 (this is the same as the case where the free capacity for update 405 becomes 0 or smaller), update data cannot be stored (appended) in the append write page. In that case, the storage apparatus 1 returns the data in the append write page subjected to update to the overwrite page. The storage apparatus 1 executes such control to prevent excessive allocation of append write pages, and to suppress pages having a high update frequency from remaining in the append write pages.

(4) Write Processing

Next, the flow of the processing (write processing) performed in a state where the storage apparatus 1 receives a write request and a write data from the host 2 directed to the virtual volume will be described with reference to FIG. 9. The write request issued by the host 2 includes information of write destination location (host LBA and data length) of the write data. If the storage controller 10 receives a write request, the CPU 11 calculates a virtual page number of the virtual page being the write destination of write data based on the information of the write destination location included in the write request (s51).

Next, the CPU 11 judges whether a page is allocated to the virtual page specified in s51 by referring to the virtual volume management table 100 (s52). If a valid value (value that is not null) is stored in the page # (104) of the record in the virtual volume management table 100 whose virtual page # (101) is equal to the virtual page number specified in s51, or if "append write" is stored in the page allocation (103) of the record in the virtual volume management table 100 whose virtual page # (101) is equal to the virtual page number specified in s51, it means that a page is allocated to the virtual page specified in s51.

If a page is not allocated to the virtual page specified in s51 (s52: No), the CPU 11 selects one unused page (page whose use (205) is set to "0") from the pool management table 200, and allocates the selected page to the write target virtual page (s53). In s53, the CPU 11 stores the page number (page # (201)) of the selected page to the page # (104) of the write target virtual page in the virtual volume management table 100, and stores "overwrite" in the page allocation (103) of the write target virtual page, by which an operation to allocate the selected page to the write target virtual page is carried out. Further, the use (205) of the selected page is changed to "1".

In s54, the CPU 11 allocates a cache memory area for temporarily storing the write data received from the host 2, and in s55, the CPU 11 stores the write data in the cache area allocated in s54. Finally, the CPU 11 sets the presence/absence of update (105) of the write target virtual page (sets "update") (s56), and ends the processing. The processing such as the allocation of the cache memory area is a well-known processing, so the description thereof will be omitted. The CPU 11 also includes information for managing the write data stored in the cache memory (such as the LBA in the virtual volume where the write data is to be written), but it is also a well-known information, so the description thereof will be omitted.

Figure 9:
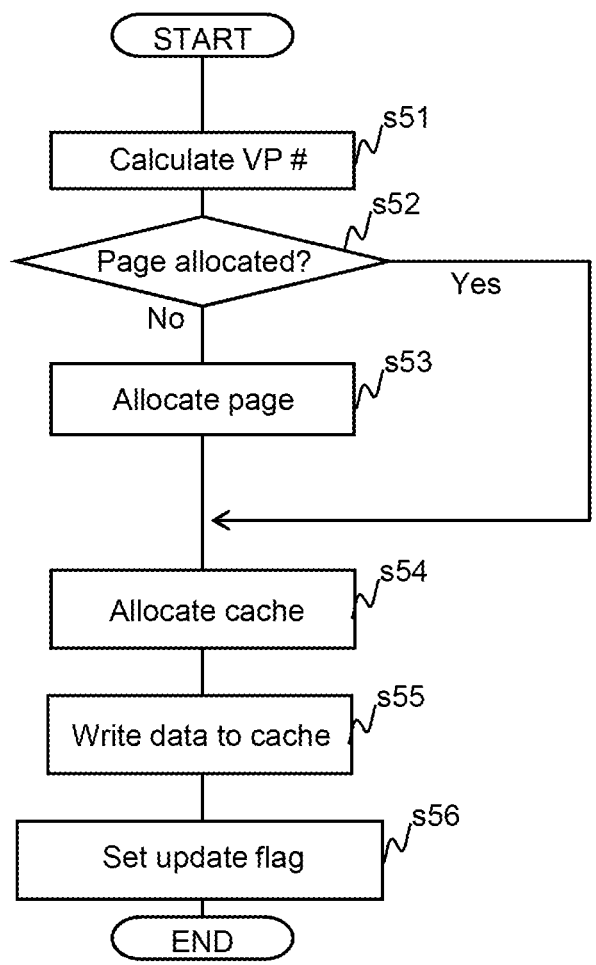
FIG. 9 is a flowchart of write processing.

The write processing illustrated in FIG. 9 is a processing for storing the write data received from the host 2 to the cache memory, and the contents of the processing is the same, regardless of whether the overwrite page or the append write page is mapped to the write destination virtual page. In the storage apparatus 1 according to the present embodiment, the cache memory is used as a so-called write-back cache. Therefore, a notice notifying that the write processing has been completed is sent to the host 2 immediately after the write data is stored in the cache memory (after completing s55 or s56 of FIG. 9). After some time has elapsed after the write data has been stored in the cache memory, the CPU 11 stores the write data in the cache memory to the storage device 20. This processing is called "destage".

(5) Destage Processing

Figure 10:
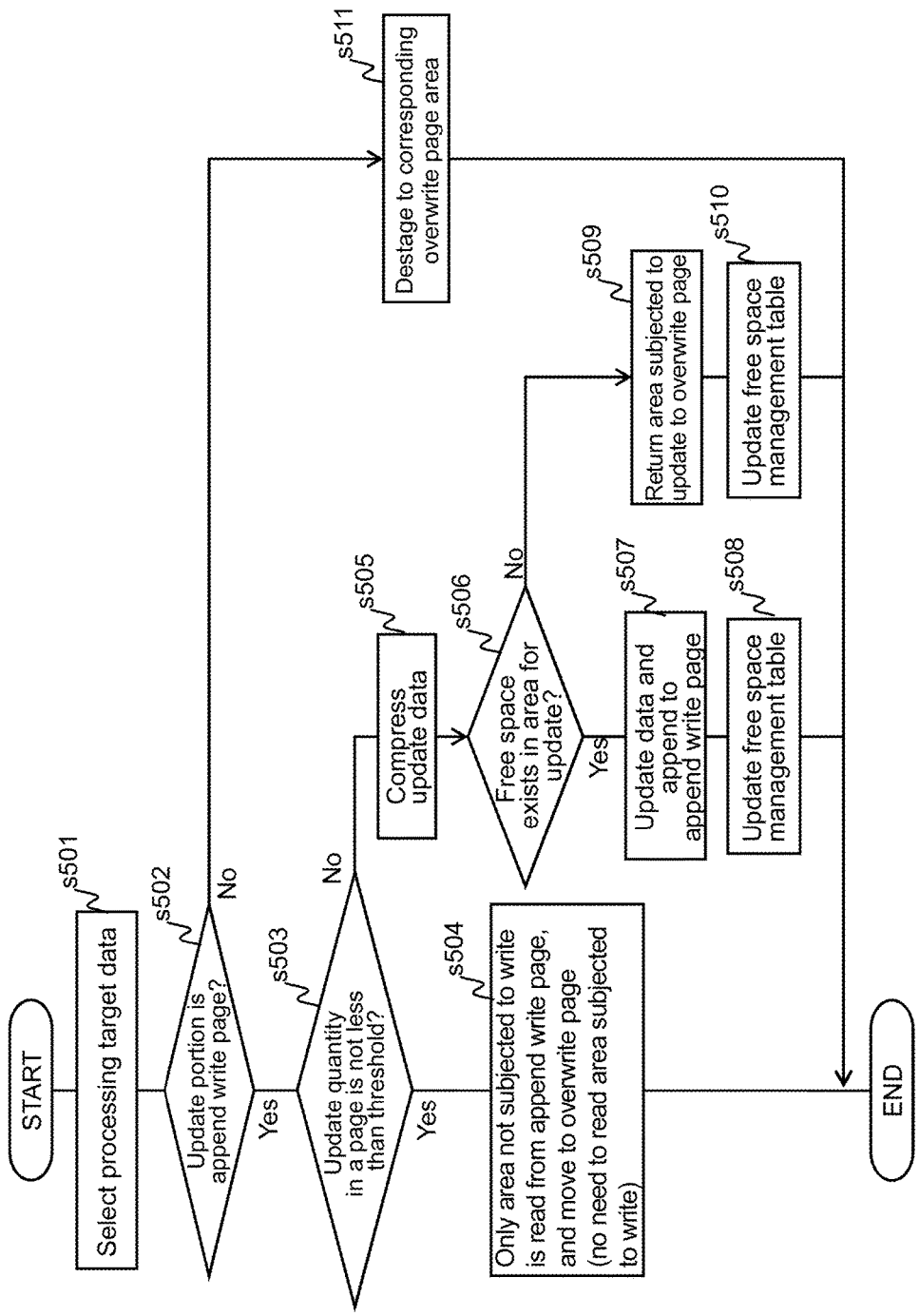
FIG. 10 is a flowchart of destage processing.

The flow of destage processing will be described with reference to FIG. 10. The processing of FIG. 10 is performed periodically. In another example, the destage processing can be executed when an amount of unused area in the cache memory becomes less than a predetermined amount. At first, the CPU 11 selects the processing target data from the data stored in the cache memory (s501). There are various methods for selecting the data. One example is a method for selecting the data whose time of write from the host is oldest. In that case, the storage controller 10 must store the time written from the host 2 for each data stored in the cache memory.

Next, the CPU 11 specifies the virtual page number of the write destination virtual page of the data selected in s501, and judges whether the page allocation (103) of the virtual page is "overwrite" or "append write" (s502). When the page allocation (103) is "overwrite" (s502: No), an overwrite page is mapped to the write destination virtual page of the data. Therefore, the CPU 11 specifies the destaging destination area of the data selected in s501, that is, the area in the overwrite page (which is the area in the storage device 20) mapped to the virtual page, destages the data to the specified destaging destination area (s511), and ends the processing. The destaging destination area can be specified by first specifying the page number by referring to the page # (104) of the virtual volume management table 100, and thereafter, referring to the DEV # (202) and the Addr (203) of the record whose page # (201) is equal to the specified page # in the pool management table 200.

When the page allocation (103) is "append write" (s502: Yes), an append write page is mapped to the write destination virtual page of the data. In that case, the CPU 11 selects all data among the data in the cache memory whose write destination virtual page is the same as the write destination virtual page of the data selected in s501. In the following description, the data selected in this manner is called "destage target data", and the write destination virtual page of the selected data is called "destage target virtual page". Then, whether the amount of destage target data is not less than the page update quantity threshold in CM 302 is judged (s503). If the amount of destage target data is not less than the page update quantity threshold in CM 302 (s503: Yes), the CPU 11 moves the data in the append write page mapped to the destage target virtual page to the overwrite page (s504).

Specifically in s504, the following processing is performed. The CPU 11 reads the data belonging to the same virtual page as the write destination virtual page number of the data selected in s501 from (the area in the storage device 20 corresponding to) the append write page to the cache memory. At this time, the area in which data is stored in the cache memory is not required to be read from the append write page. Further, upon reading the data onto the cache memory, the CPU 11 decompresses data by using the compression circuit 16, and stores the decompressed data in the cache memory.

Next, the CPU 11 executes page allocation to the destage target virtual page. The page allocated here is the overwrite page, and the same processing as that in s53 is performed. Thereafter, the CPU 11 destages the data to the allocated overwrite page, and ends the processing. Simultaneously as the destaging in s504, update of the LBA management table 120 and the append write page management table 130 is performed. Specifically, the records whose host LBA 121 are within the range of the destage target virtual page are deleted from the LBA management table 120. Further, among the records in the append write page management table 130, the records whose values of the host LBA 133 are within the range of the destage target virtual page have their host LBA 133 changed to null.

Figure 11:
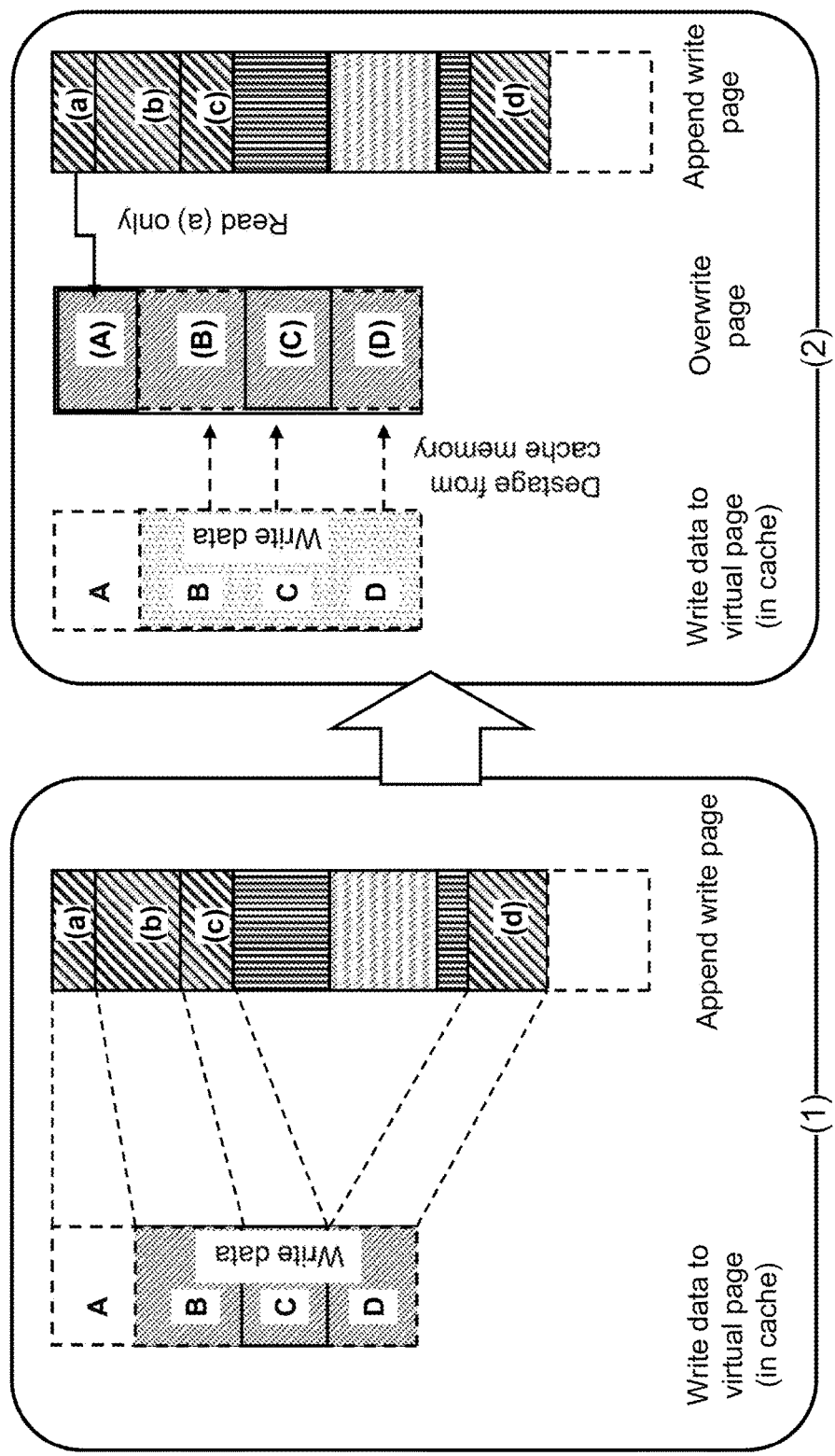
FIG. 11 is a conceptual diagram of movement of data from an append write page to an overwrite page.

The concept of processing in s504 will be described with reference to FIG. 11. FIG. 11 is a conceptual diagram of the processing of moving data from the append write page to the overwrite page. FIG. 11(1) illustrates a state in which a predetermined amount (page update quantity threshold in CM 302) or more of update data from the host 2 to the virtual page to which the append write page is mapped is stored in the cache memory. Among areas A, B, C and D in the virtual page, areas B, C and D are where write occurred from the host 2, and the write data (update data) is accumulated in the cache memory (wherein areas A, B, C and D each correspond to one segment or a set of a plurality of segments). Further, an append write page is mapped to the virtual page illustrated in FIG. 11(1), and the compressed segments mapped to areas A, B, C and D on the virtual page are compressed segments (a), (b), (c) and (d), respectively.

How to move data performed in s504, when the virtual page, data in the cache memory, and the append write page are in the state illustrated in FIG. 11(1), is illustrated in FIG. 11(2). The CPU 11 reads the compressed segment (a) from the append write page, performs decompression, and writes the decompressed data to the overwrite page (area (A)) (at this time, the decompressed data can be temporarily stored in the cache memory). Meanwhile, there is no need to read the compressed segments (b), (c) and (d) in the append write page from the append write page. Instead, the data in the cache (data of B, C and D) is destaged to the overwrite page.

As described, in s504, regarding the virtual page having a high update data quantity, data is moved from the append write page to the overwrite page, such that overhead of data compression processing can be reduced. Further, since the amount of compressed data read from the append write page in the storage device can be suppressed to a minimum, the overhead of data read processing from the storage device and the overhead of decompressing data which was read can be reduced.

We will now return to the description of FIG. 10. At the judgement in s503, if the amount of data is less than the predetermined value (s503: No), the CPU 11 compresses the destage target data (s505), and compares the compressed data size with the free capacity for update 405, in order to judge whether there is a free space capable of storing the destage target data (after compression). If there is no free space capable of storing the destage target data (s506: No. In other words, a case where the allocatable quantity for update 403 is exceeded if the destage target data is stored), the CPU 11 decompresses the data in the append write page mapped to the write destination virtual page of the destage target data, and returns the decompressed data to the overwrite page (s509). The processing in s509 is the same as that in s504. That is, the area where the destage target data is stored in the cache memory is not required to be read from the append write page.

Thereafter, the CPU 11 performs update of the content of the free space management table 400 (s510), and ends the processing.

There may be a case where a plurality of processing target data are selected in s501, and the write destination virtual pages of the respective data differ. In that case, upon moving the data from the append write page to the overwrite page in s509, the CPU 11 should preferentially select the page having a low compression rate, and move the data in that page to the overwrite page. This is because the storage area can be saved by preferentially storing pages having higher compression rates to the append write page (compressed page).

In the example of FIG. 4 (virtual volume management table 100), the data in the pages (append write pages) mapped to virtual pages (VP #4 through VP #7) whose virtual page # (101) are 4 through 7 is the data to be moved to the overwrite pages (since the presence/absence of update (105) is "update"). When they are rearranged in ascending order of compression rate (descending order of allocation quantity (111)), the order will be VP #6, VP #5, VP #7 and VP #4. Therefore, a processing should be performed to return the append write pages mapped to VP #6 with highest priority to the overwrite page, and thereafter, return the data in the named order of VP #5, VP #7 and VP #4 to the overwrite page.

If there is a free space capable of storing the destage target data (after compression) (s506: Yes), the CPU 11 appends the destage target data (after compression) to the append write page (s507), updates the contents of the free space management table 400 (s508), and ends the processing. In s507, since data (compressed segment) is appended to the append write page, the CPU 11 also performs update of the LBA management table 120 and the append write page management table 130 in the manner described earlier.

The above has described an example of compressing the update data (destage target data) and then storing (appending) the data in the append write page (s505 through s508 of FIG. 10). However, as a different embodiment, the storage apparatus 1 can append the update data to the append write page without performing compression. In that case, the processing of s505 becomes unnecessary, and the overhead of the compression processing can be reduced.

(6) Movement of Overwrite Page to Append Write Page

Next, the move judgement processing of the overwrite page will be described with reference to FIG. 12. Here, a processing is performed to specify the overwrite page satisfying a predetermined condition (whether there has been no update for a predetermined period of time), and to move the data in that overwrite page to the append write page. This processing is performed by the CPU 11 periodically, such as once a day.

At first, the CPU 11 searches the virtual volume management table 100 to select one virtual page to which the overwrite page is mapped (that is, the virtual page whose page allocation (103) is "overwrite") (s1010). In the description of FIG. 12, the virtual page selected in s1010 is called a "target virtual page". Thereafter, the CPU 11 judges whether the presence/absence of update (105) of the target virtual page is "no update" or "update" (s1020).

If the presence/absence of update (105) is "update" (s1020: No), the CPU 11 sets the continuous period of no update (107) of the target virtual page to 0 (s1120). Then, the CPU 11 changes the presence/absence of update (105) of the target virtual page to "no update" (s1095). Thereafter, if processing has been performed to all virtual pages (s1100: Yes), the CPU 11 ends the processing, and if there still remains a virtual page not subjected to processing (s1100: No), the CPU 11 repeats the processing from s1010.

If the presence/absence of update (105) is "no update" at the judgment in s1020 (s1020: Yes), the CPU 11 updates the continuous period of no update (107) of the target virtual page (s1030). Specifically, if the processing of FIG. 12 is performed every 24 hours (every day), "1" is added to the continuous period of no update (107) of the target virtual page.

Thereafter, the CPU 11 judges whether the continuous period of no update (107) of the target virtual page is not less than the compression permission threshold 301. If the continuous period of no update (107) of the target virtual page is not less than the compression permission threshold 301 (s1060: Yes), the CPU 11 reads data from the overwrite page mapped to the target virtual page, and compresses the read data using the compression circuit 16. Then, the CPU 11 appends the compressed data to the append write page, and also updates the LBA management table 120 and the append write page management table 130 in the manner described earlier (s1080). Before appending to the append write page, the CPU 11 refers to the append write page management table 130 and the last write location 134, and judges whether an amount of unused append write pages required to append compressed data exists. If there is no unused append write page, the CPU 11 selects an unused page (page whose use (205) is "0") from the pages managed in the pool management table 200, and registers the selected unused page in the append write page management table 130.

Thereafter, the CPU 11 changes the page allocation 103 of the target virtual page to "append write", the page # of the target virtual page (104) to null, and the allocation quantity (111) of the target virtual page to the size of the data compressed in s1080 (size after compression) (s1090). Further, in s1090, the CPU 11 updates the contents of the free space management table 400. As for the page (overwrite page) which has been mapped to the target virtual page, the mapping to the target virtual page is cancelled. Therefore, among the records of the pool management table 200, the CPU 11 updates the use (205) field of the page which has been mapped to the target virtual page to "0".

After s1090 (or after s1060 in the case where the continuous period of no update (107) of the target virtual page is less than the compression permission threshold 301 (s1060: No)), the CPU 11 executes s1095 and s1100. If processing has been performed to all virtual pages (s1100: Yes), the processing is ended, and if there still remains a virtual page not subjected to processing (s1100: No), processing is repeated from s1010.

(7) Update of Free Space Management Table

Figure 13:
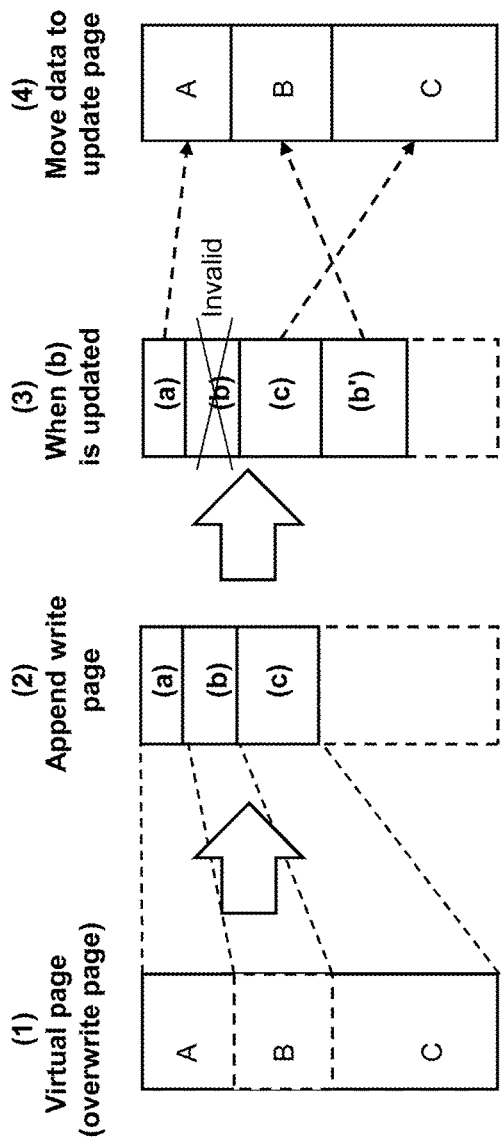
FIG. 13 is a view illustrating a change of content of the free space management table accompanying data movement.

The contents performed at the point where the free space management table 400 is updated, that is, at s504, s508, s510 and s1080, will be described with reference to FIG. 13. FIG. 13 conceptually illustrates a change of state of a page (especially an append write page) when the data in an overwrite page mapped to a certain virtual page (hereinafter referred to as "virtual page V") is moved to an append write page. FIG. 13(1) illustrates an overwrite page mapped to the virtual page V.

Each of the areas A, B and C of FIG. 13(1) is composed of one or more segments. FIG. 13(2) illustrates an append write page serving as a destination for moving data in the overwrite page of FIG. 13(1). Areas (a), (b) and (c) of FIG. 13(2) respectively store data (after compression) moved from the areas A, B and C.

FIG. 13(3) illustrates an example of the case in which update has occurred to area (b) of FIG. 13(2) (in a state where update data is received from the host 2 directed to an area on the virtual page V to which area (b) is mapped), and the update data is appended in area (b'). At this time, area (b) becomes an invalid area (area not mapped to the virtual page). FIG. 13(4) illustrates an example of the case in which the data in the append write page (data in areas (a), (b') and (c)) is moved to the overwrite page.

Hereafter, the change of contents of the free space management table 400 in a state where the state of the page changes as illustrated in FIGS. 13(1) through (4) will be described. In the following description, it is assumed that the respective sizes of the areas (a), (b), (b') and (c) are a, b, b' and c, and that the free space allocation rate 401 is p. Further, in order to simplify description, an example is illustrated where only the data in the page mapped to the virtual page V is stored in the append write page.

At first, a case is illustrated where data is moved from the overwrite page to the append write page (when the state of the page transits from state (1) to (2) in FIG. 13). This is the case when s1080 and s1090 of FIG. 12 are executed. In s1090, the CPU 11 stores (adds) "a+b+c" (size after compression of data corresponding to one page moved from the overwrite page) to the append write data quantity 402 of the free space management table 400.

Along with the change of the append write data quantity 402, the allocatable quantity for update 403 is also updated. The value of the amount of data moved to the append write page (a+b+c) multiplied by the free space allocation rate 401 (p) is stored (added) to the allocatable quantity for update 403. As a result, the allocatable quantity for update 403 becomes "(a+b+c)×p". Further, the free capacity for update 405 is updated into the value obtained by subtracting the free space use quantity 404 from the allocatable quantity for update 403 after update (that is, "(a+b+c)×p").

Next, we will describe a case where the data in the append write page has been updated (when the status of the page transits from the state of (2) to (3) in FIG. 13). This is the case when s507 and s508 of FIG. 10 are executed. In the state of FIG. 13(3), area (b) becomes invalid, and area (b') is stored instead of area (b). In that case, the size of area (b) is subtracted from the append write data quantity 402, and the size of area (b') is added instead. This is because in the state of FIG. 13(2), areas (a), (b) and (c) are not mapped to the virtual page V, but areas (a), (b') and (c) are mapped to the virtual page V. Therefore, in s508, the CPU 11 updates the value of the append write data quantity 402 to "a+c+b'".

Further, since update data is appended in the append write page (data is appended in area (b')), the CPU 11 adds "b'" in the free space use quantity 404. Further, along with the change of the append write data quantity 402, the allocatable quantity for update 403 is also updated. The value having the append write data quantity 402 (that is, "a+c+b'") multiplied by the free space allocation rate 401 (p) is stored in the allocatable quantity for update 403. Further, the free capacity for update 405 is updated to a value obtained by subtracting the free space use quantity 404 (b') from the allocatable quantity for update 403 after update (that is, "(a+c+b')×p−b'").

Next, we will describe a case where data is moved from the append write page to the overwrite page (when the status of the page is transited from the state of (3) to (4) of FIG. 13). This is the case when s504 or s510 of FIG. 10 is executed. At this time, the data in areas (a), (b') and (c) are moved to the overwrite page. Therefore, in s504 or s510, the CPU 11 subtracts the size of areas (a), (b') and (c) (that is, "a+c+b'") from the append write data quantity 402 of the free space management table 400, and subtracts (a+c+b')×p from the allocatable quantity for update 403. Further, the free space use quantity 404 is not changed. Similar to other cases, the free capacity for update 405 is updated to a value obtained by subtracting the free space use quantity 404 from the allocatable quantity for update 403 after update. Like the case in FIG. 13(4), the case that the value of the free capacity for update 405 becomes a negative value may occur.

In transition to the state of FIG. 13(4), the free space use quantity 404 will not be changed (reduced) (stays as b'). This is because update data cannot be written to area (b') since only append write is allowed as data write to an append write page, though valid data is not stored in area (b'). The free space use quantity 404 is reduced when garbage collection is carried out. After the garbage collection is carried out, the CPU 11 changes the free space use quantity 404 to 0, and at the same time, changes the free capacity for update 405 (to a value obtained by subtracting the free space use quantity 404 from the allocatable quantity for update 403).

If only collecting unused area and packing data are performed in the garbage collection, the append write data quantity 402 will not vary. Therefore the values of the append write data quantity 402 and the allocatable quantity for update 403 are not updated. However, if a processing that causes the variation of the append write data quantity 402 (such as a processing in which data having a low compression rate is moved to an overwrite page) is performed together with the garbage collection, the values of the append write data quantity 402 and the allocatable quantity for update 403 are also updated.

The storage apparatus 1 according to the present embodiment executes garbage collection periodically. However, garbage collection can be executed in midway of the processing described above. For example, the CPU 11 can execute garbage collection when it has been judged at s506 in FIG. 10 that there is no free space capable of storing the destage target data.

The above has described the storage apparatus according to the first embodiment. The storage apparatus according to the first embodiment compresses the data in the page (overwrite page) mapped to the virtual page matching a predetermined condition (such as a virtual page in which update has not occurred for a predetermined period of time or longer), and moves the compressed data to a different page (append write page). Thereby, the storage area can be saved while maintaining the access performance of the storage apparatus.

Further, when data is moved to the append write page, the storage apparatus according to the first embodiment determines the amount of free space for writing (appending) update data directed to the data in the append write page based on the amount of data moved to the append write page. If the amount of update data is increased and there is no more free space, the data in the append write page is decompressed and returned to the overwrite page. Since the free space is used for writing update data and is not used for storing write data to the overwrite page (page storing uncompressed data), the storage efficiency of the storage apparatus is substantially reduced if a large amount of free space is allocated. On the other hand, if there is small free space, the efficiency (performance) of garbage collection of the append write page is deteriorated. By controlling the size of the free space as in the storage apparatus of the first embodiment, it becomes possible to realize both the maintenance of storage efficiency and the performance of garbage collection.

Further, the storage apparatus according to the first embodiment stores the write data directed to the virtual page from the host temporarily in the cache memory. Then, if the amount of accumulated data in the cache memory directed to the virtual page to which the append write page is mapped (that is, where compressed data is stored) exceeds a threshold (the page update quantity threshold in CM 302), the data is read from the append write page and moved to the overwrite page. At this time, data is not read from the append write page for the area where the write data from the host is accumulated in the cache memory. Therefore, the data movement efficiency from the append write page to the overwrite page is good.

Second Embodiment

Next, a storage apparatus according to a second embodiment will be described. A hardware configuration of the storage apparatus according to the second embodiment is the same as that described in the first embodiment.

In the storage apparatus according to the first embodiment, after data is moved from an overwrite page mapped to a certain virtual page to an append write page, if a large amount of write (update) occurs to the append write page (occurs to the virtual page to which the append write page is mapped), the data in the append write page is returned to the overwrite page. For example, if a data write not less than the page update quantity threshold in CM 302 occurs to one virtual page, and the data is accumulated in the cache memory, the data is returned to the overwrite page even if an append write page is mapped to the virtual page.

Such event may be considered in a case where a sequential write request has been received from the host 2 to the virtual volume. For example, when the host 2 uses the virtual volume as a data backup destination volume, the host 2 writes a large amount of data to the virtual volume sequentially.

For example, we will assume a case where the compression permission threshold 301 is 28 days, and the host 2 uses the virtual volume as a backup destination volume with a frequency of once a month (every 30 days). In this case, when 28 days is elapsed from the time when the host writes data to the virtual volume, on the 29th day, data movement from the pages (overwrite pages) mapped to the virtual pages in the virtual volume to the append write pages occurs.

However, on the next day (30th day), since the host 2 writes a large amount of data to the virtual volume sequentially for backup, the data is moved from the append write page to the overwrite page. Therefore in this case, the period of time in which the data is stored in a compressed state is limited to only 2 days among 30 days, and the effect of saving of storage area by compression is very little. Further in this case, since data update occurs only one day during the 30 days, the data written in this case should preferably be saved in the compressed state.

The storage apparatus according to the second embodiment learns data access pattern, and when the case described above occurs, it extends the period of time during which the data is saved in the compressed state. Further, by learning the data access pattern, it predicts the time (date) when data update occurs in advance, and moves data to the overwrite page before the date.

FIG. 14 illustrates a configuration example of a virtual volume management table 100' managed by the storage apparatus according to the second embodiment. The virtual volume management table 100' includes columns of a virtual page # (101'), a host LBA (102'), a page allocation (103'), a page # (104'), a presence/absence of update (current) (105'), a presence/absence of update (previous) (106'), a continuous period of no update (current) (107'), a continuous period of no update (backup) (108'), a continuous period of no update (after learning movement) (109'), a learning movement flag (110'), and an allocation quantity (111').

The contents of the information stored in the virtual page # (101'), the host LBA (102'), the page allocation (103'), the page # (104'), the presence/absence of update (current) (105'), the continuous period of no update (current) (107) and the allocation quantity (111') are the same as the virtual page # (101), the host LBA (102), the page allocation (103), the page # (104), the presence/absence of update (105), the continuous period of no update (107) and the allocation quantity (111) of the virtual volume management table 100 described in the first embodiment. The other information will be described later.

Figures 15, 16:
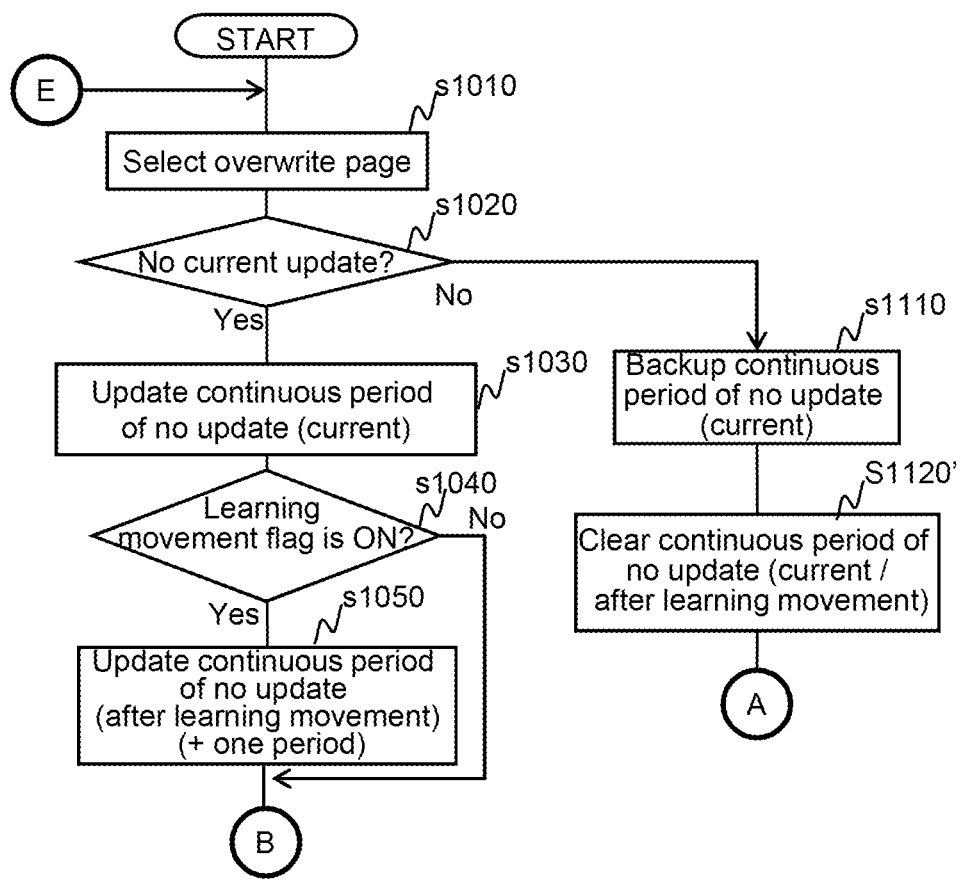
FIG. 15 illustrates a configuration example of a threshold table in the storage apparatus according to the second embodiment.
FIG. 16 is a flowchart (1) of move judgement processing.

FIG. 15 illustrates a configuration example of a threshold table 300' managed by the storage apparatus according to the second embodiment. The threshold table 300' stores the compression permission threshold 301, the page update quantity threshold in CM 302 and a learning movement threshold 303. The compression permission threshold 301 and the page update quantity threshold in CM 302 are the same as those described in the first embodiment. The content of the learning movement threshold 303 will be described in the description of the move judgement processing of the overwrite page.

Figure 12:
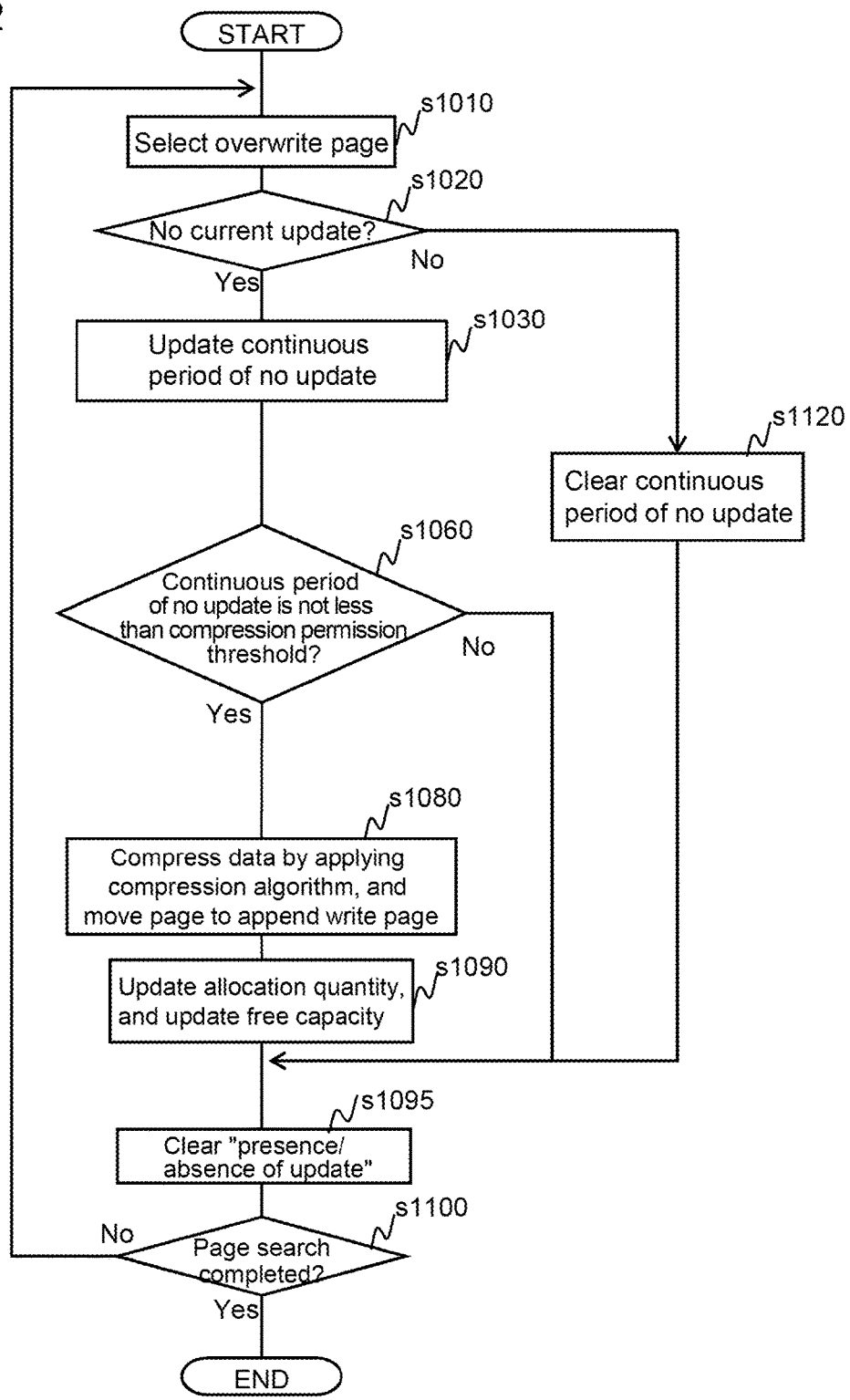
FIG. 12 is a flowchart of a move judgement processing.

In the storage apparatus according to the second embodiment, the contents of the virtual volume management table 100' and the threshold table 300' described above differ, and further, the content of move judgement processing of the overwrite page differs from that described in the first embodiment (FIG. 12). Further in the storage apparatus according to the second embodiment, a process of moving the data in the append write page to the overwrite page based on the learning result is added. The flow of the write processing is basically similar to that described in the first embodiment (FIG. 9), but differs in that the CPU 11 sets "update" in the presence/absence of update (current) (105') instead of the presence/absence of update (105) at the end of the write processing. As for the other points, the storage apparatus according to the second embodiment is similar to the storage apparatus according to the first embodiment. For example, the destage processing (FIG. 10) described in the first embodiment is also executed in the storage apparatus according to the second embodiment.

Figure 17:
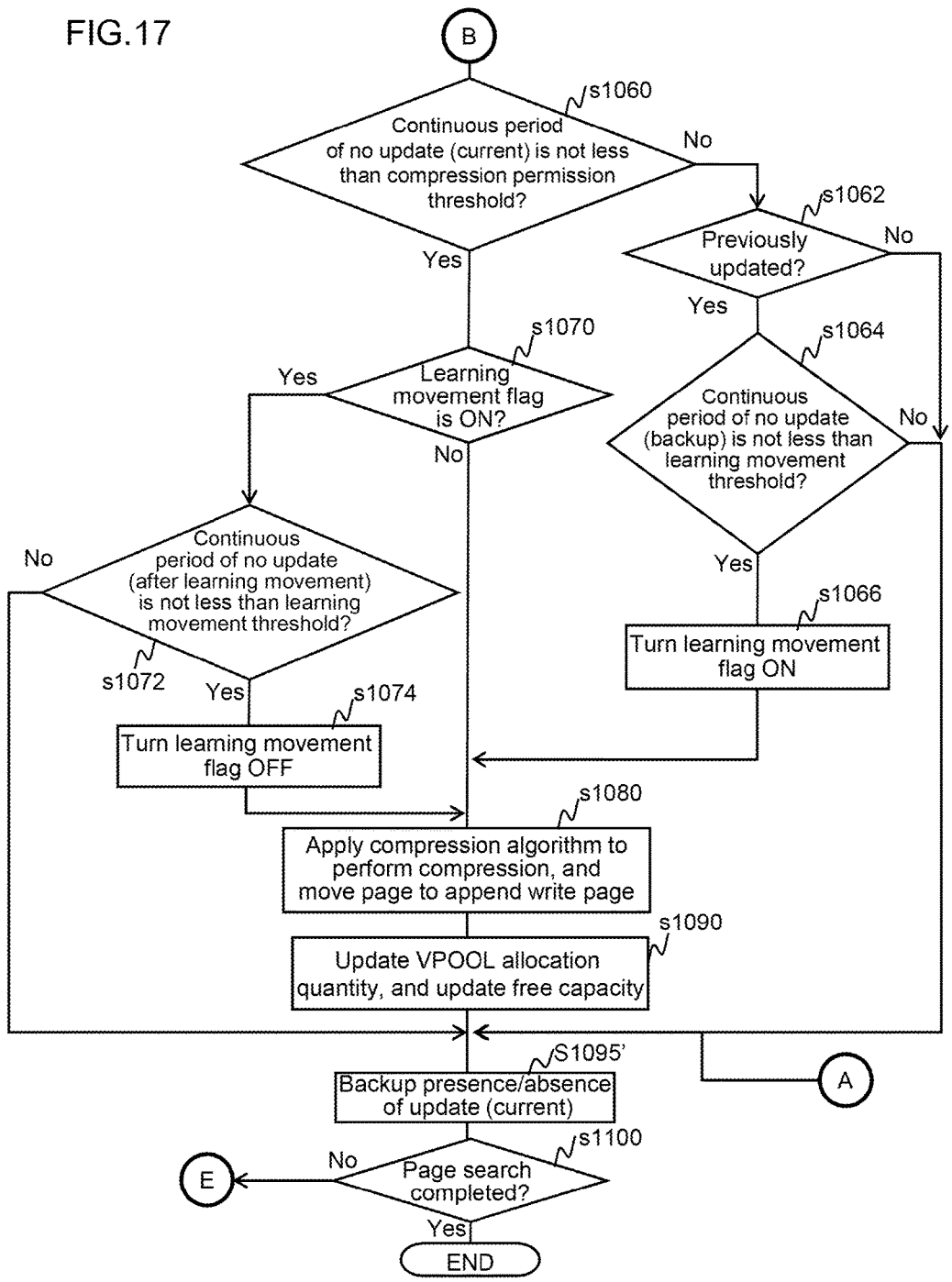
FIG. 17 is a flowchart (2) of move judgement processing.

In the following description, the flow of move judgement processing of the overwrite page (hereafter called "move judgement processing") performed in the storage apparatus of the second embodiment will be described with reference to FIGS. 16 and 17. Many of the processes are the same as those described in the first embodiment (FIG. 12), so in the following description, the points that differ from the processing of FIG. 12 will mainly be described.

Steps s1010, s1020 and s1030 of FIG. 16 are similar to those described in the first embodiment (FIG. 12). However, in the move judgement processing according to the second embodiment, in s1020, the CPU 11 performs judgement based on the presence/absence of update (current) (105') of the virtual page selected in s1010 (hereafter, this virtual page is called a "target virtual page". In the following description, we will describe a case where the presence/absence of update (current) (105') of the target virtual page is "update" in the judgment of s1020 (s1020: No).

If the state where the presence/absence of update (current) (105') of the target virtual page is "update", the CPU 11 stores the value of the continuous period of no update (current) (107') of the target virtual page to the continuous period of no update (backup) (108') (s1110). Thereafter, the CPU 11 sets the continuous period of no update (current) (107') and the continuous period of no update (after learning movement) (109') of the target virtual page to 0 (s1120'). Then, the CPU 11 changes the value of the presence/absence of update (current) (105') of the target virtual page to "no update" (s1095') after it saves the value of the presence/absence of update (current) (105') to the presence/absence of update (previous) (106'). Thereafter, if processing has been performed to all virtual pages (s1100: Yes), the CPU 11 ends the processing, and if there still remains a virtual page not subjected to processing (s1100: No), the processing is repeated from s1010.

If the presence/absence of update (current) (105') of the target virtual page is "no update" (s1020: Yes), the CPU 11 executes s1030. After executing s1030, the CPU 11 judges whether the learning movement flag 110' of the target virtual page is ON. If the learning movement flag 110' is ON (s1040: Yes), the CPU 11 updates the continuous period of no update (after learning movement) (109') (s1050). For example, if the move judgement processing (processing in FIGS. 16 and 17) is performed every 24 hours (per day), "1" is added to the continuous period of no update (after learning movement) (109) of the target virtual page. Thereafter, the processing of s1060 is performed. If the learning movement flag 110' is OFF (s1040: No), the processing of s1050 will be skipped.

Thereafter, the CPU 11 judges whether the continuous period of no update (current) (107') of the target virtual page is not less than the compression permission threshold 301 (s1060). If the continuous period of no update (current) (107) of the target virtual page is not less than the compression permission threshold 301 (s1060: Yes), the CPU 11 judges whether the learning movement flag 110' is ON (s1070). If the learning movement flag 110' is OFF (s1070: No), the CPU 11 executes s1080 and s1090, similar to the first embodiment. After executing s1095', if processing has been performed to all virtual pages (s1100: Yes), the CPU 11 ends the processing, and if there still remains a virtual page not subjected to processing (s1100: No), the processing is repeated from s1010.

If the learning movement flag 110' is ON (s1070: Yes), the CPU 11 judges whether the continuous period of no update (after learning movement) (109') is not less than the learning movement threshold 303 (s1072). If the judgment of s1072 is Yes, the CPU 11 changes the learning movement flag 110' to OFF (s1074), and thereafter, performs the processing of s1080 and thereafter. The CPU 11 judges whether the continuous period of no update (after learning movement) (109') is not less than the learning movement threshold 303 (s1072). If the judgment of s1072 is No, that is, if the continuous period of no update (after learning movement) (109') is smaller than the learning movement threshold 303, the processes of s1074, s1080 and s1090 are skipped (that is, the movement of data of the target virtual page is not performed).

In s1060, if the continuous period of no update (current) (107) of the target virtual page is smaller than the compression permission threshold 301 (s1060: No), the CPU 11 judges whether the presence/absence of update (previous) (106') is "update" or "no update" (s1062). If the presence/absence of update (previous) (106') is "no update" (s1062: No), the CPU 11 executes the processes of s1095' and thereafter.

Meanwhile, if the presence/absence of update (previous) (106') is "update" in s1062 (s1062: Yes), the CPU 11 judges whether the continuous period of no update (backup) (108') is not less than the learning movement threshold 303 (s1064). If the judgment at s1064 is Yes, the CPU 11 changes the learning movement flag 110' to OFF (s1066), and thereafter, performs the processes of s1080 and thereafter. If the judgement at s1064 is No, the CPU 11 performs the processes of s1095' and thereafter.

Next, the flow of move processing of data in the append write page to the overwrite page based on the learning result executed in the storage apparatus according to the second embodiment will be described with reference to FIG. 18. This processing is performed periodically, such as once a day.

At first, the CPU 11 searches the virtual volume management table 100, thereby to select one virtual page whose learning movement flag 110' is ON among the virtual pages (that is, the virtual pages whose page allocation (103) is "append write") to which the append write pages are mapped (s1510). In the following description of FIG. 18, the virtual page selected in s1510 is called a "target virtual page". The append write page mapped to the target virtual page is called a "target append write page".

Thereafter, the CPU 11 judges whether the presence/absence of update (current) (105') of the target virtual page is "update" or "no update" (s1520). If the presence/absence of update (current) (105') of the target virtual page is "no update" (81520: Yes), the continuous period of no update (current) (107') of the target virtual page is updated (s1530). This processing is similar to s1030.

In s1550, the CPU 11 judges whether the continuous period of no update (current) (107') of the target virtual page is equal to the continuous period of no update (backup) (108') or not (s1550), and if it is equal, decompresses the data in the append write page mapped to the target virtual page, and moves the data to the overwrite page (s1560). In s1560, a processing similar to s509 and s510 of the first embodiment are performed. Thereafter, the CPU 11 sets the continuous period of no update (after learning movement) (109') of the target virtual page to 0 (s1570), and changes the value of the presence/absence of update (current) (105') to "no update" after saving the value of the presence/absence of update (current) (105') to the presence/absence of update (previous) (106') (s1575). If the processing of FIG. 18 is performed for all the virtual pages to which the append write page is mapped (s1580: Yes), the processing is ended. If there is a virtual page not yet subjected to the processing of FIG. 18, the CPU 11 repeats the processes from s1510.

In s1520, if the presence/absence of update (current) (105') of the target virtual page is "update" (s1520: No), the CPU 11 copies (saves) the content of the continuous period of no update (current) (107') to the continuous period of no update (backup) (108') (s1610), sets the contents of the continuous period of no update (current) (107') and the continuous period of no update (after learning movement) (109') to 0 (s1620), and sets the learning movement flag (110' to OFF (s1630). Thereafter, the judgement of s1580 is performed.

The above has described the storage apparatus according to the second embodiment. The storage apparatus according to the second embodiment learns the update cycle (update pattern) of the virtual page, and suppresses data in a virtual page which is less frequently updated from occupying the overwrite page. Specifically, the storage apparatus specifies a virtual page having an update pattern in which update occurs one in (n+1) days (no update occurs for n days in a row, and update occurs on the (n+1)th day). Here, n is a value equal to or larger than the learning movement threshold 303. If there is such virtual page, the storage apparatus moves the data in the virtual page from the overwrite page to the append write page (processing of s1062 through s1090 of FIG. 17). At the same time, the storage apparatus stores the period during which update has not occurred to the virtual page (in the continuous period of no update (backup) 108'). In other words, the storage apparatus stores a learning result (estimated result) that the update cycle of the virtual page is (1+continuous period of no update (backup) 108') days.

Figure 18:
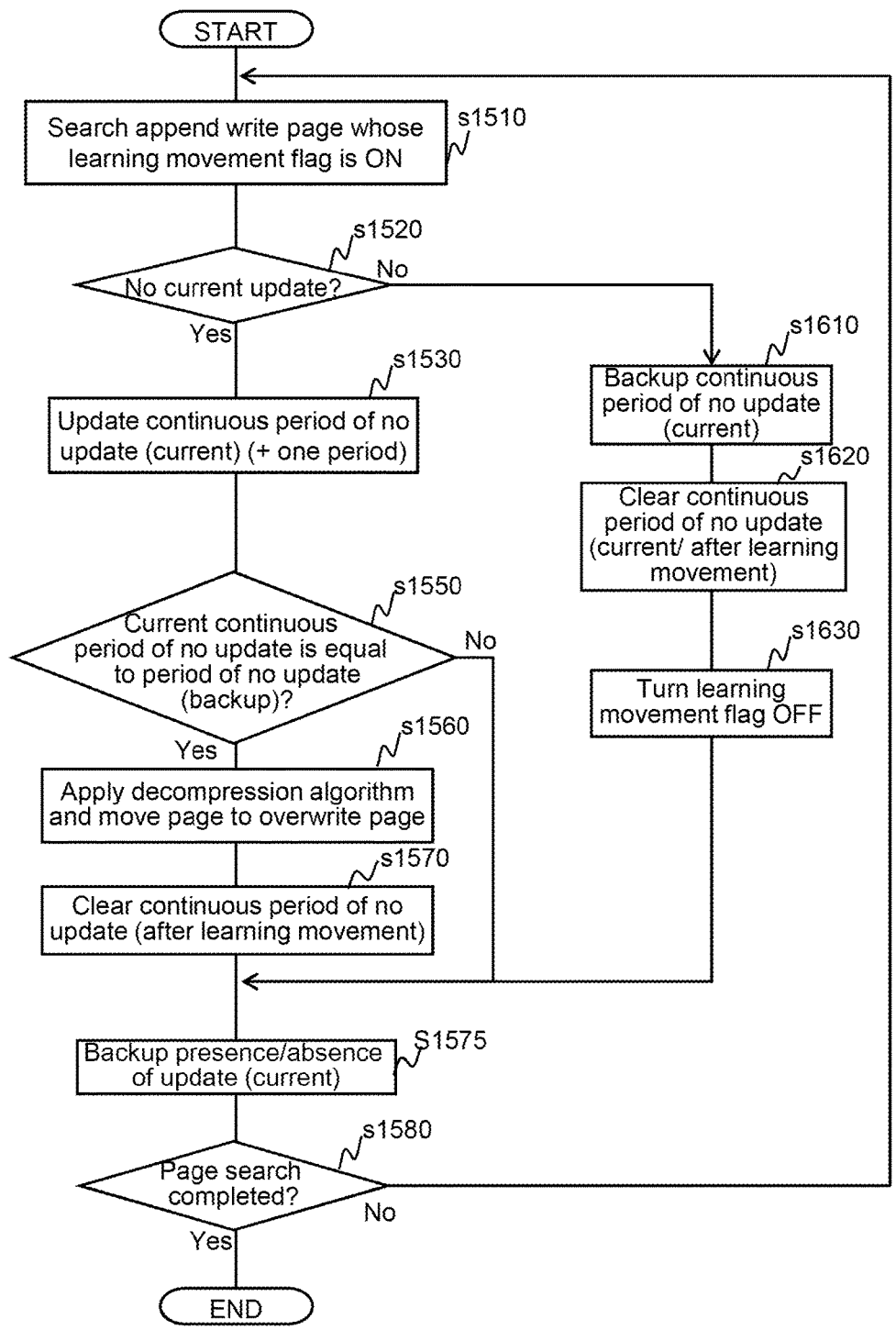
FIG. 18 is a flowchart of move processing of data in an append write page to an overwrite page based on a learning result.

After the data has been moved to the append write page, if there has been no update for a predetermined period of time (period of time stored in the continuous period of no update (backup) 108') to the virtual page to which the append write page is mapped, the storage apparatus determines that update directed to this virtual page will soon occur, and moves the data in the append write page mapped to this virtual page to the overwrite page before update occurs (s1550 through s1570 of FIG. 18). Therefore, the access performance during occurrence of data update can be improved.

Further, in the case of the storage apparatus according to the first embodiment, as described earlier, the period of time in which the data is stored in a compressed state (stored in the append write page) is shortened even when the update frequency of the virtual page is low. In the storage apparatus according to the second embodiment, the data moved to the overwrite page is moved to the append write page without waiting for passing the time indicated in the compression permission threshold 301 unless there is a change in the update cycle, by executing the processing of FIG. 17 (processing of s1062 through s1090 and so on). Therefore, during the period of time when there is no data update, data is stored in a compressed state in the storage device, such that both the performance and the storage efficiency of the storage apparatus can be realized.

The present embodiments have been described, but they are merely examples for describing the present invention, and are not intended to limit the scope of the present invention to the illustrated embodiments. The present invention can be implemented in various other forms.

An example has been illustrated where some of the information used by the storage apparatus is managed by a table structure such as the pool management table 200, but the present invention is not restricted to the embodiment of managing the information in a table structure. The storage apparatus can manage the information in a data structure other than the table, such as a list structure.

According further to the embodiments described above, the data stored in the append write page is a compressed data, but the data stored in the append write page is not restricted to compressed data. For example, if the storage apparatus has a function to perform data conversion such as encryption, and data conversion is performed by the data conversion function such that the data size is varied thereby, it is possible to store the data after conversion to the append write page, and perform inverse conversion when returning the data from the append write page to the overwrite page.

Furthermore, the data stored in the append write page is not restricted to the data to which data conversion such as compression or encryption is performed. The data stored in the overwrite page and the append write page may both be uncompressed data or data not subjected to data conversion. As an example, we will assume a case where a storage device that does not have high random write performance but has high sequential write performance is used as the storage device in the storage apparatus. In that case, the storage apparatus observes the access performance (such as write frequency, or ratio of sequential and random writes) of the respective virtual pages, and based on the observation result, performs control to move the data in the virtual page having a high random write frequency to the append write page, and allocate overwrite pages to the virtual pages frequently subjected to sequential write, the random write data will be stored in the append write page, and sequential write is performed during writing of data to the storage device. Therefore, the access performance is expected to be improved.

As another example, the control method described in the above embodiment is effective in a storage apparatus in which different types of storage devices are installed. For example, if a storage apparatus is equipped with both a write-once storage device (storage device using a storage media such as a DVD-RW or a flash memory where overwrite is not permitted whose storage area must be erased to perform re-write) and a rewritable storage device (such as a HDD), the storage apparatus should preferably perform control to use the storage area of the rewritable storage device as the overwrite page, and the storage area of the write-once storage device as the append write page. Then, by performing control to move the data having a low update frequency to the append write page, as described in the above embodiment, an erase frequency of storage media of the write-once storage device can be suppressed to a low value, and the access efficiency of the storage apparatus is expected to be improved. Even according to this case, the data stored in the append write page may be data that the data conversion such as compression is applied, or can be uncompressed data.

REFERENCE SIGNS LIST

1: Storage apparatus, 2: host, 3: SAN, 5: management host, 10: storage controller, 11: CPU, 12: host I/F, 13: device I/F, 14: memory, 15: management I/F, 16: compression circuit, 20: storage device

The invention claimed is:

1. A storage apparatus comprising one or more storage devices, and a storage controller,
wherein the storage controller:
manages a storage area of the storage device by dividing into an overwrite area in which overwrite of update data from a host is permitted, and an append write area in which update data from the host is appended,
moves data between the overwrite area and the append write area when the storage controller detects that the overwrite area in which the data is stored is in a state corresponding to a predetermined condition,
determines a size of the append write area based on an amount of the data moved from the overwrite area to the append write area,
provides a volume to the host, and allocate the storage area of the storage device dynamically to an area in the volume to which a write request from the host has occurred,
if the storage controller receives a write data directed to the area in the volume to which the append write area is allocated, the storage controller appends the write data to the append write area, and
if an amount of data written to the append write area exceeds the size of the append write area, the storage controller returns the data in the append write area to the overwrite area,
comprises a cache memory configured to temporarily store the write data from the host,
if a predetermined amount or larger of the write data directed to the area in the volume to which the append write area is allocated is stored in the cache memory, the storage controller returns the data stored in the append write area to the overwrite area,
wherein if the write data directed to a first area is stored in the cache memory and the write data directed to a second area is not stored in the cache memory; the first area and the second area being part of the areas in the volume to which the append write area are allocated, and
among the data stored in the append write area, the data before update of the write data directed to the first area is not returned to the overwrite area.

2. The storage apparatus according to claim 1,
wherein the storage controller moves the data stored in the overwrite area to the append write area when the storage controller detects that write from the host to the overwrite area in which the data is stored has not occurred for a predetermined period of time.

3. The storage apparatus according to claim 1,
wherein upon moving the data stored in the overwrite area to the append write area, the storage controller generates compressed data from the data, and appends the compressed data to the append write area.

4. The storage apparatus according to claim 1,
wherein if compressed data is stored in the append write area, among the compressed data, the storage controller returns the compressed data having a low compression rate preferentially to the overwrite area, and upon returning the compressed data to the overwrite area, the storage controller decompresses the compressed data before returning the data to the overwrite area.

5. The storage apparatus according to claim 1,
wherein the storage controller estimates an update cycle of the area in the volume through observation of access pattern from the host directed to the area in the volume, and
based on the estimated update cycle, data stored in the append write area allocated to the area in the volume is returned to the overwrite area before receiving a write request directed to the area in the volume from the host.

6. The storage apparatus according to claim 1,
wherein the storage controller comprises a cache memory configured to temporarily store write data from the host,
the storage controller is configured to provide a volume to the host, and dynamically allocate either the overwrite area or the append write area to an area in the volume to which a write request from the host has occurred, and
the storage controller is configured to:
A) store an update data to the cache memory when the update data directed to the area in the volume is received from the host,
B) if the update data is to be written to the area in the volume to which the overwrite area is allocated, overwrite the update data to the overwrite area,
C) if it is detected that a write to the area in the volume to which the overwrite area is allocated has not occurred for a predetermined period of time, allocate the append write area to the area in the volume, compress data stored in the overwrite area and move the data to the append write area, and increase a size of the append write area based on an amount of data moved from the overwrite area to the append write area,
D) if the update data is to be written to the area in the volume to which the append write area is allocated, judge whether an amount of the update data directed to the area in the volume stored in the cache memory is equal to or larger than a predetermined amount,
D-1) if the amount of the update data directed to the area in the volume stored in the cache memory is equal to or larger than a predetermined amount, allocate the overwrite area to the area in the volume, store the update data stored in the cache memory to the overwrite area, and move data whose update data is not stored in the cache memory among the data stored in the append write area that has been allocated to the area in the volume to the overwrite area, and
D-2) if the update data to the area in the volume less than the predetermined amount is stored in the cache memory,
D-2-1) append the update data to the append write area if there is an area in which the update data can be appended in the append write area, and
D-2-2) return the data in the append write area to the overwrite area if there is no area in which the update date can be appended in the append write area.

7. A method for controlling a storage apparatus comprising one or more storage devices and a storage controller, the method performed by the storage controller comprising:
managing a storage area of the storage device by dividing into an overwrite area in which overwrite of update data from a host is permitted, and an append write area in which the update data from the host is appended, moving data between the overwrite area and the append write area when the storage controller detects that the overwrite area in which the data is stored is in a state corresponding to a predetermined condition, determining a size of the append write area based on an amount of the data moved from the overwrite area to the append write area, providing a volume to the host, and allocate the storage area of the storage device dynamically to an area in the volume to which a write request from the host has occurred, if the storage controller receives a write data directed to the area in the volume to which the append write area is allocated, the storage controller appends the write data to the append write area, and if an amount of data written to the append write area exceeds the size of the append write area, the storage controller returns the data in the append write area to the overwrite area, a cache memory configured to temporarily store the write data from the host, if a predetermined amount or larger of the write data directed to the area in the volume to which the append write area is allocated is stored in the cache memory, the storage controller returns the data stored in the append write area to the overwrite area, wherein if the write data directed to a first area is stored in the cache memory and the write data directed to a second area is not stored in the cache memory; the first area and the second area being part of the areas in the volume to which the append write area are allocated, and among the data stored in the append write area, the data before update of the write data directed to the first area is not returned to the overwrite area.

8. A storage apparatus comprising one or more storage devices, and a storage controller, the storage controller comprises a cache memory configured to temporarily store write data from the host; and wherein the storage controller manages a storage area of the storage device by dividing into an overwrite area in which overwrite of update data from a host is permitted, and an append write area in which update data from the host is appended, the storage controller moves data between the overwrite area and the append write area when the storage controller detects that the overwrite area in which the data is stored is in a state corresponding to a predetermined condition, the storage controller is configured to provide a volume to the host, and dynamically allocate either the overwrite area or the append write area to an area in the volume to which a write request from the host has occurred, and the storage controller is further configured to:

A) store an update data to the cache memory when the update data directed to the area in the volume is received from the host, B) if the update data is to be written to the area in the volume to which the overwrite area is allocated, overwrite the update data to the overwrite area, C) if it is detected that a write to the area in the volume to which the overwrite area is allocated has not occurred for a predetermined period of time, allocate the append write area to the area in the volume, compress data stored in the overwrite area and move the data to the append write area, and increase a size of the append write area based on an amount of data moved from the overwrite area to the append write area, D) if the update data is to be written to the area in the volume to which the append write area is allocated, judge whether an amount of the update data directed to the area in the volume stored in the cache memory is equal to or larger than a predetermined amount, D-1) if the amount of the update data directed to the area in the volume stored in the cache memory is equal to or larger than a predetermined amount, allocate the overwrite area to the area in the volume, store the update data stored in the cache memory to the overwrite area, and move data whose update data is not stored in the cache memory among the data stored in the append write area that has been allocated to the area in the volume to the overwrite area, and D-2) if the update data to the area in the volume less than the predetermined amount is stored in the cache memory, D-2-1) append the update data to the append write area if there is an area in which the update data can be appended in the append write area, and D-2-2) return the data in the append write area to the overwrite area if there is no area in which the update date can be appended in the append write area.

* * * * *